(12) United States Patent
Kawata et al.

(10) Patent No.: US 9,479,025 B2
(45) Date of Patent: Oct. 25, 2016

(54) DRIVE DEVICE AND ELECTRIC POWER STEERING DEVICE INCLUDING THE DRIVE DEVICE

(71) Applicant: DENSO CORPORATION, Kariya, Aichi-pref. (JP)

(72) Inventors: Hiroyuki Kawata, Chiryu (JP); Masashi Yamasaki, Obu (JP); Takeshi Sawada, Gifu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/812,807

(22) Filed: Jul. 29, 2015

(65) Prior Publication Data

US 2016/0036289 A1    Feb. 4, 2016

(30) Foreign Application Priority Data

Jul. 31, 2014  (JP) ................................. 2014-156484
Jun. 3, 2015   (JP) ................................. 2015-113189

(51) Int. Cl.
*H02K 11/00*  (2016.01)
*H02K 5/22*   (2006.01)
*B62D 5/04*   (2006.01)

(52) U.S. Cl.
CPC ............. *H02K 5/225* (2013.01); *B62D 5/0412* (2013.01); *B62D 5/0463* (2013.01); *H02K 11/001* (2013.01); *H02K 11/0073* (2013.01); *H02K 11/33* (2016.01)

(58) Field of Classification Search
CPC .... H02K 11/33; H02K 5/225; H02K 11/048; H02K 9/22; H02K 2211/03

USPC ......... 310/64, 71, 68 D, 68 R, 179–180, 184
See application file for complete search history.

(56) References Cited

U.S. PATENT DOCUMENTS 6,380,648 B1 *  4/2002  Hsu ......................... H02K 3/28
                                                  310/67 A (Continued)

FOREIGN PATENT DOCUMENTS

JP       2003-153552 A      5/2003

OTHER PUBLICATIONS

U.S. Appl. No. 14/812,415, filed Jul. 29, 2015, Yamasaki, et al.

(Continued)

*Primary Examiner* — Thanh Lam
(74) *Attorney, Agent, or Firm* — Knobbe, Martens, Olson & Bear, LLP

(57) ABSTRACT

A drive device includes a rotating electric machine, a substrate, a first drive element, a second drive element, a first extension line, and a second extension line. The rotating electric machine including a stator with a first winding group and a second winding group wound on the stator in at least three phases. The first extension line and the first drive element, as well as the second extension line and the second drive element have respectively reversed phase orders in an arrangement of the phase orders from an end close to a reference position toward an other end of the arrangement. In such manner, variation of wiring lengths from an electric power supply region among different phases is reduced.

12 Claims, 20 Drawing Sheets

(56) References Cited

U.S. PATENT DOCUMENTS

| | | | | |
|---|---|---|---|---|
| 8,436,500 | B2* | 5/2013 | Minato | H02M 7/003 310/68 C |
| 8,829,746 | B2* | 9/2014 | Yamasaki | B62D 5/0406 310/110 |
| 2013/0099610 | A1* | 4/2013 | Suga | H02K 3/50 310/71 |
| 2014/0035445 | A1* | 2/2014 | Uryu | H02K 11/33 310/68 D |
| 2014/0202781 | A1* | 7/2014 | Soma | H02K 3/50 180/65.1 |

OTHER PUBLICATIONS

U.S. Appl. No. 14/812,757, filed Jul. 29, 2015, Yamasaki, et al.
U.S. Appl. No. 14/812,886, filed Jul. 29, 2015, Yamasaki.
U.S. Appl. No. 14/812,866, filed Jul. 29, 2015, Kawata, et al.
U.S. Appl. No. 14/812,769, filed Jul. 29, 2015, Kadoike, et al.
U.S. Appl. No. 14/812,730, filed Jul. 29, 2015, Yamanaka, et al.
U.S. Appl. No. 14/812,753, filed Jul. 29, 2015, Kabune.
U.S. Appl. No. 14/812,733, filed Jul. 29, 2015, Yamasaki, et al.
U.S. Appl. No. 14/812,767, filed Jul. 29, 2015, Hayashi.

* cited by examiner

DRIVE DEVICE AND ELECTRIC POWER STEERING DEVICE INCLUDING THE DRIVE DEVICE

CROSS REFERENCE TO RELATED APPLICATION

The present application is based on and claims the benefit of priority of Japanese Patent Applications No. 2014-156484, filed on Jul. 31, 2014, and No. 2015-113189, filed on Jun. 3, 2015, the disclosure of which are incorporated herein by reference.

TECHNICAL FIELD

The present disclosure generally relates to a drive device and an electric power steering device using including a drive device.

BACKGROUND INFORMATION

Conventionally, a close positioning of a motor and an inverter circuit that controls the motor is well known. For example, according to a disclosure of a Japanese Patent Laid-Open No. 2003-153552, (patent document 1) a circuit board having an inverter circuit arranged thereon is housed in one case, which is then attached on an outer shell of a compressor.

FIG. 4 of the patent document 1 illustrates that six power controller semiconductors are mounted on a circuit board. However, the patent document 1 is silent about a phase arrangement order of the three-phase inverter.

SUMMARY

It is an object of the present disclosure to provide a drive device that reduces a variation of wiring length among plural phases and an electric power steering device using such a drive device.

In an aspect of the present disclosure, the drive device includes a rotating electric machine, a substrate, a first drive element, a second drive element, a first extension line, and a second extension line.

The rotating electric machine including a stator with a first winding group and a second winding group wound on the stator in at least three phases. A rotor is located relative to the stator, and a shaft rotates with the rotor.

The substrate is located on one axial end of the rotating electric machine. The first drive element is arranged on one surface of the substrate in a first region and constitutes a first inverter that switches a power supply to the first winding group. The second drive element is arranged on a same surface of the substrate as the first drive element in a second region and constituting a second inverter that switches a power supply to the second winding group.

The second region is symmetric to the first region relative to a shaft of the rotating electric machine. The first extension line extends from each of the at least three phases of the first winding group to be connected to the substrate The second extension line extending from each of the at least three phases of the second winding group to be connected to the substrate.

The first extension line and the first drive element, as well as the second extension line and the second drive element have respectively reversed phase orders in an arrangement of the phase orders from an end close to a reference position toward an other end of the arrangement. In such manner, a variation of the wiring lengths among the plural phases on the substrate is reduced.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the drive device in the present disclosure and the electric power steering are described with reference to the drawings.

First Embodiment

The drive device in the first embodiment of the present disclosure and the electric power steering device are shown in FIGS. 1-11. Hereafter, in all embodiments described in the following, the same numerals represent the same parts, for the brevity of the description.

Figure 1:
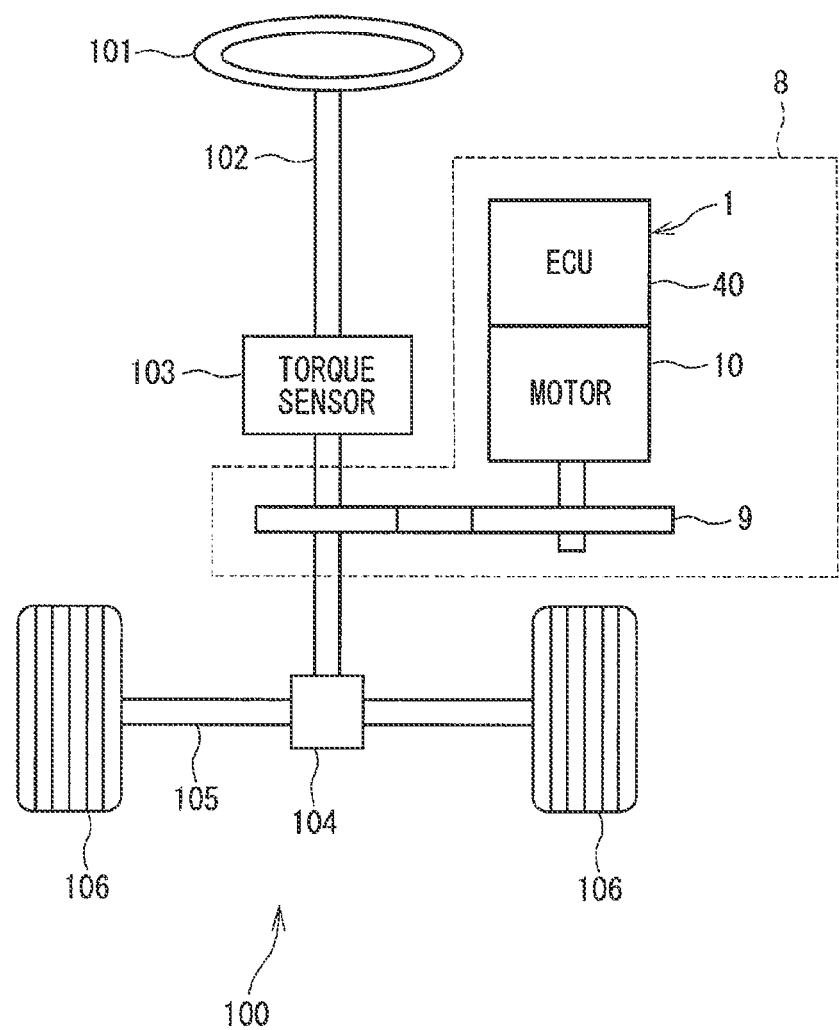
FIG. 1 is a system diagram of an electric power steering device in a first embodiment of the present disclosure.

As shown in FIG. 1, a drive device 1 is applied to an electric power steering device 8 for assisting the steering operation by the driver. The drive device 1 is a one-body combination of a motor 10 serving as a rotating electric machine and an ECU 40 serving as a controller for controlling the motor 10.

FIG. 1 shows a system diagram of a steering system 100 having the electric power steering device 8. The steering system 100 comprises a steering wheel 101, a column shaft 102, a pinion gear 104, a rack shaft 105, wheels 106, and the electric power steering device 8 etc. respectively serving as a component of the system.

The steering wheel 101 is connected to the column shaft 102. The column shaft 102 has a torque sensor 103 disposed thereon, which is used for detecting a steering torque which is input thereto when the driver operates the steering wheel 101. At a tip of the column shaft 102, the pinion gear 104 is disposed, which engages with the rack shaft 105. On both ends of the rack shaft 105, a pair of wheels 106 is disposed via a tie rod and the like.

Thereby, when the driver rotates the steering wheel 101, the column shaft 102 connected to the steering wheel 101 rotates. The rotational movement of the column shaft 102 is turned into a translational movement of the rack shaft 105 by the pinion gear 104, and the pair of wheels 106 is steered by an angle according to an amount of displacement of the rack shaft 105.

The electric power steering device 8 is provided with a speed reduction gear 9, which serves as a power transmission part, and the drive device 1. The electric power steering device 8 outputs the assisting torque from the motor 10 based on the signals from the torque sensor 103 and the vehicle speed obtained from a Controller Area Network (CAN) which is not illustrated, and transmits the torque to the column shaft 102 via the speed reduction gear 9, for assisting the steering operation of the steering wheel 101. That is, the electric power steering device 8 of the present embodiment is what is designated as a "column assistance" type, which assists a rotation of the column shaft 102 with the torque generated by the motor 10. However, the device 8 may also be used as a "rack assistance" type, which assists the drive of the rack shaft 105. In other words, the column shaft 102 serving as "a drive object" in the present embodiment may be replaced with other objects, e.g., with the rack shaft 105.

Figure 2:
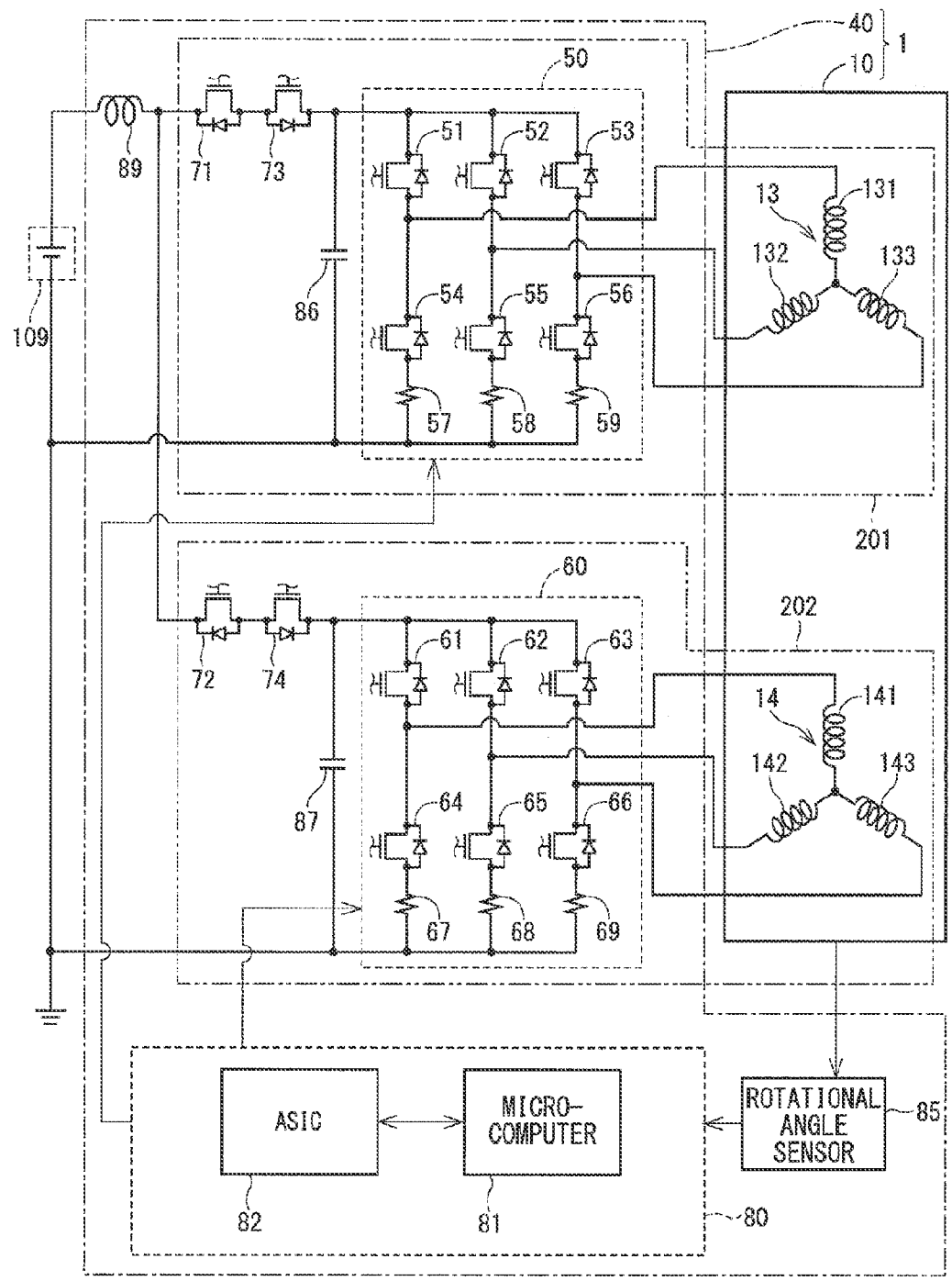
FIG. 2 is a schematic diagram of a circuit configuration of a drive device in the first embodiment of the present disclosure.

Next, the electrical configuration of the electric power steering device 8 is described based on FIG. 2. In FIG. 2, for the readability of the drawing, a part of the control lines etc. are omitted therefrom.

The motor 10 is a three-phase brushless motor, and has a first winding group 13 and a second winding group 14 respectively wound on a stator 12 which are mentioned later.

The first winding group 13 comprises a U phase coil 131, a V phase coil 132, and a W phase coil 133. The second winding group 14 comprises a U phase coil 141, a V phase coil 142, and a W phase coil 143.

The ECU 40 is provided with a first inverter part 50, a second inverter part 60, power relays 71, 72, reverse connection protection relays 73 and 74, a control unit 80, a rotational angle sensor 85, capacitors 86 and 87, and a choke coil 89, which are respectively mounted on a substrate 41 mentioned below. In the present embodiment, the electronic components which constitute the ECU 40 are mounted on one substrate 41. In such configuration, the number of components on the ECU 40 is reduced in comparison to a case where plural substrates 41 are used, thereby reducing the volume of the drive device 1.

The first inverter part 50 has six switching elements (SW elements) 51-56 combined in a bridge connection form, for the switching of the power supply to the first winding group 13. The second inverter part 60 has six SW elements 61-66 in a bridge connection form, for the switching of the power supply to the second winding group 14.

Although the SW elements 51-56, 61-66 of the present embodiment are Metal Oxide Semiconductor Field Effect Transistor (MOSFET), other elements such as Insulated Gate Bipolar Transistor (IGBT) and the like may also be used.

As for the SW elements 51, 52, and 53 arranged on the high potential side of the first inverter part 50, the drain is connected to a positive electrode of a battery 109 that serves as a power supply, and the source is connected to the drain of the SW elements 54, 55, and 56 arranged on the low potential side.

The source of the SW elements 54, 55, and 56 is connected to a negative electrode of the battery 109 via current detection elements 57, 58, and 59. The junction points between the SW elements 51, 52, 53 on the high potential side and the SW elements 54, 55, 56 on the low potential side are connected to the U phase coil 131, the V phase coil 132, and the W phase coil 133, respectively.

As for the SW elements 61, 62, and 63 arranged on the high potential side of the second inverter part 60, the drain is connected to the positive electrode of the battery 109, and the source is connected to the drain of the SW elements 64, 65, and 66 arranged on the low potential side.

The source of the SW elements 64, 65, 66 is connected to the negative electrode of the battery 109 via current detection elements 67, 68, and 69. The junction points between the SW elements 61, 62, 63 on the high potential side and the SW elements 64, 65, 66 on the low potential side are connected to the U phase coil 141, the V phase coil 142, and the W phase coil 143, respectively.

In the present embodiment, the SW elements 51-56 correspond to "the first plurality of drive elements," or as "the first drive element" in the claims, and the SW elements 61-66 correspond to "the second plurality drive elements" or as "the second drive element." Further, the SW elements 51-53, 61-63 correspond to "the high potential side elements" in the claims, and the SW elements 54-56, 64-66 correspond to "the low potential side elements".

The current detection elements 57, 58, and 59 are disposed on the low potential side of the SW elements 54-56 respectively corresponding to the three phases of the first winding group 13, for detecting the electric current in each of the three phases of the first winding group 13.

The current detection elements 67, 68, and 69 are disposed on the low potential side of the SW elements 64-66 respectively corresponding to the three phases of the second winding group 14, for detecting the electric current in each of the three phases of the second winding group 14.

The current detection elements 57-59, 67-69 of the present embodiment are implemented as shunt resistors.

The power relay 71 is disposed at a position between the battery 109 and the first inverter part 50, and conducts or intercepts the electric current between the battery 109 and the first inverter part 50.

The power relay 72 is disposed at a position between the battery 109 and the second inverter part 60, and conducts or intercepts the electric current between the battery 109 and the second inverter part 60.

The reverse connection protection relay 73 is disposed at a position between the power relay 71 and the first inverter part 50. The reverse connection protection relay 74 is disposed at a position between the power relay 72 and the second inverter part 60.

The reverse connection protection relays 73 and 74 prevent the electric current flowing in a reverse direction for the protection of the ECU 40, when, e.g., in the case when the battery 109 is connected in reverse, by having a parasitic diode connected in reverse relative to the power relays 71, 72.

In the present embodiment, the power relays 71, 72 and the reverse connection protection relays 73, 74 are all MOSFETS. However, other semiconductor elements such as IGBT and the like may also be used as those relays 71, 72. In the present embodiment, the power relays 71, 72 are a "relay".

The control unit 80 has a microcomputer 81, which serves as an electronic component and a calculation component, and an Application Specific Integrated Circuit (ASIC) 82, which serves as an Integrated Circuit (IC), together with other parts, which are integrated circuit components.

The microcomputer 81 calculates an instruction value concerning the power supply to the first winding group 13 and the second winding group 14 based on the signal from the torque sensor 103 or the rotational angle sensor 85 and the like.

The ASIC 82 comprises a pre-driver, a signal amplifier, a regulator, and the like. The pre-driver generates a driving signal based on the instruction value, and outputs the generated driving signal to the first inverter part 50 and to the second inverter part 60. More practically, the pre-driver outputs the generated driving signal to the gate of the SW elements 51-56, 61-66. By the switching operation of the SW elements 51-56, 61-66 according to the driving signal, an Alternating Current (AC) according to the instruction value is supplied to the first winding group 13 and to the second winding group 14 from the first inverter part 50 and the second inverter part 60, respectively. Thereby, the motor 10 is driven.

The signal amplifier amplifies the detection signal (i.e., a voltage between both terminals in the present embodiment) of the current detection elements 57-59, 67-69, and the detection value of the rotational angle sensor 85, and outputs them to the microcomputer 81. Further, the regulator is a stabilization circuit which stabilizes the voltage supplied to the microcomputer 81 and the like.

The rotational angle sensor 85 is constituted by a magnetism detection element, and detects a rotation angle of a rotor 15 by detecting a rotating magnetic field from a magnet 18 provided on an other end 162 of a shaft 16 mentioned later.

The capacitor 86 is connected in parallel with the first inverter part 50. The capacitor 87 is connected in parallel with the second inverter part 60. In the present embodiment, the capacitors 86 and 87 are the aluminum electrolytic capacitors, and are disposed on the inverter side (i.e., on one side close to the inverter parts 50, 60) of the relays 71-74. The choke coil 89 is connected at a position between the battery 109 and the positive electrodes of the capacitors 86 and 87. In the present embodiment, the choke coil 89 is disposed on the battery side (i.e., on one side close to the battery 109) of the relays 71-74).

The capacitors 86 and 87 and the choke coil 89 serve as a filter circuit, reducing the noise transmitted from the drive device 1 to the other devices that share the power supply from the battery 109 with the drive device 1, and also reducing the noise transmitted from the other devices back to the drive device 1 sharing the battery 109. The capacitors 86 and 87 store the electric charge, and support the electric power supply to the first inverter part 50 and the second inverter part 60.

In the present embodiment, the first inverter part 50, the power relay 71, the reverse connection protection relay 73, and the capacitor 86 are grouped as a first system 201, corresponding to the first winding group 13. Further, the second inverter part 60, the power relay 72, the reverse connection protection relay 74, and the capacitor 87 are grouped as a second system 202, corresponding to the second winding group 14. That is, a drive control of the motor 10 is performed in plural systems, i.e., in two systems in the present embodiment.

Figure 3:
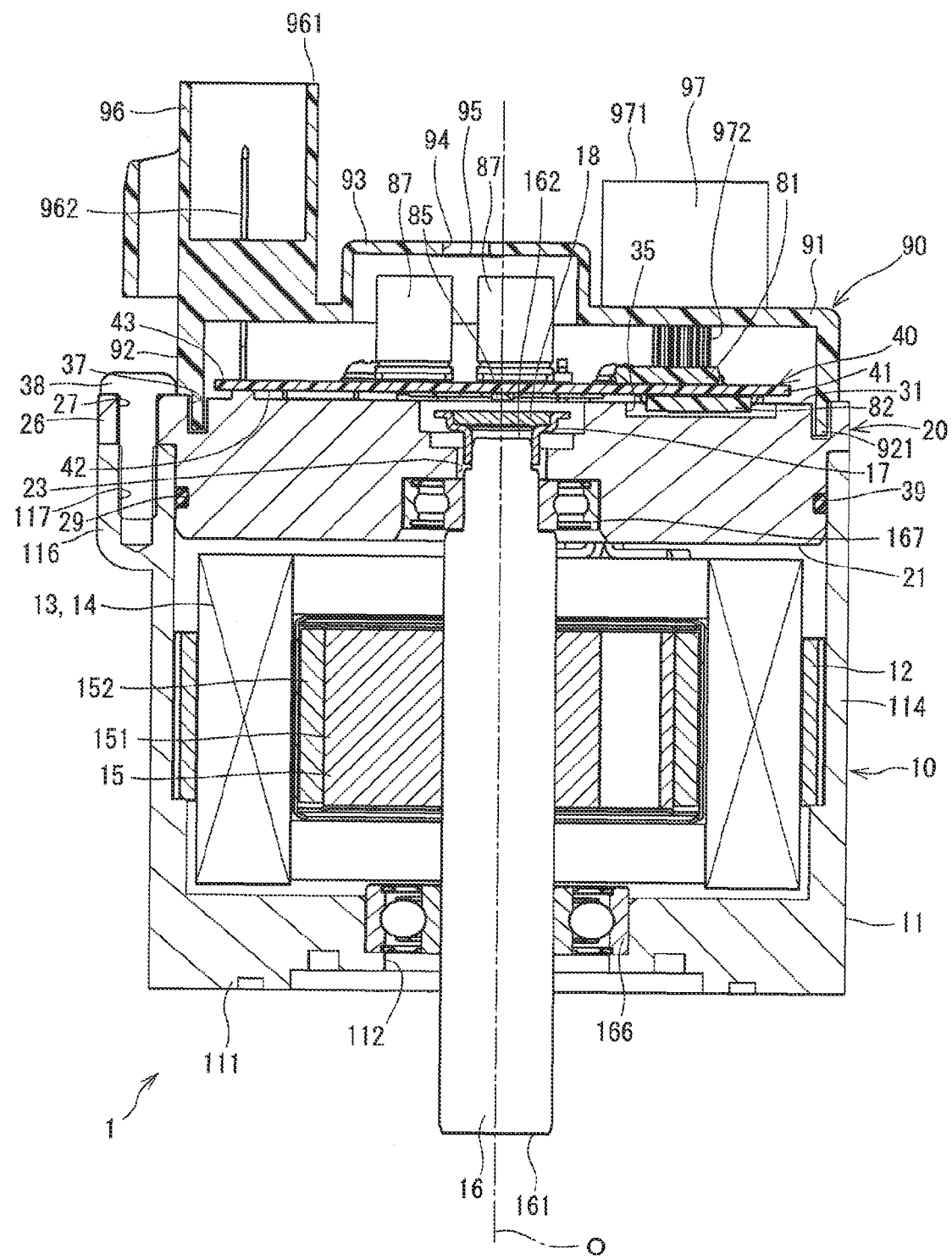
FIG. 3 is a sectional view of the drive device in the first embodiment of the present disclosure.
Figure 4:
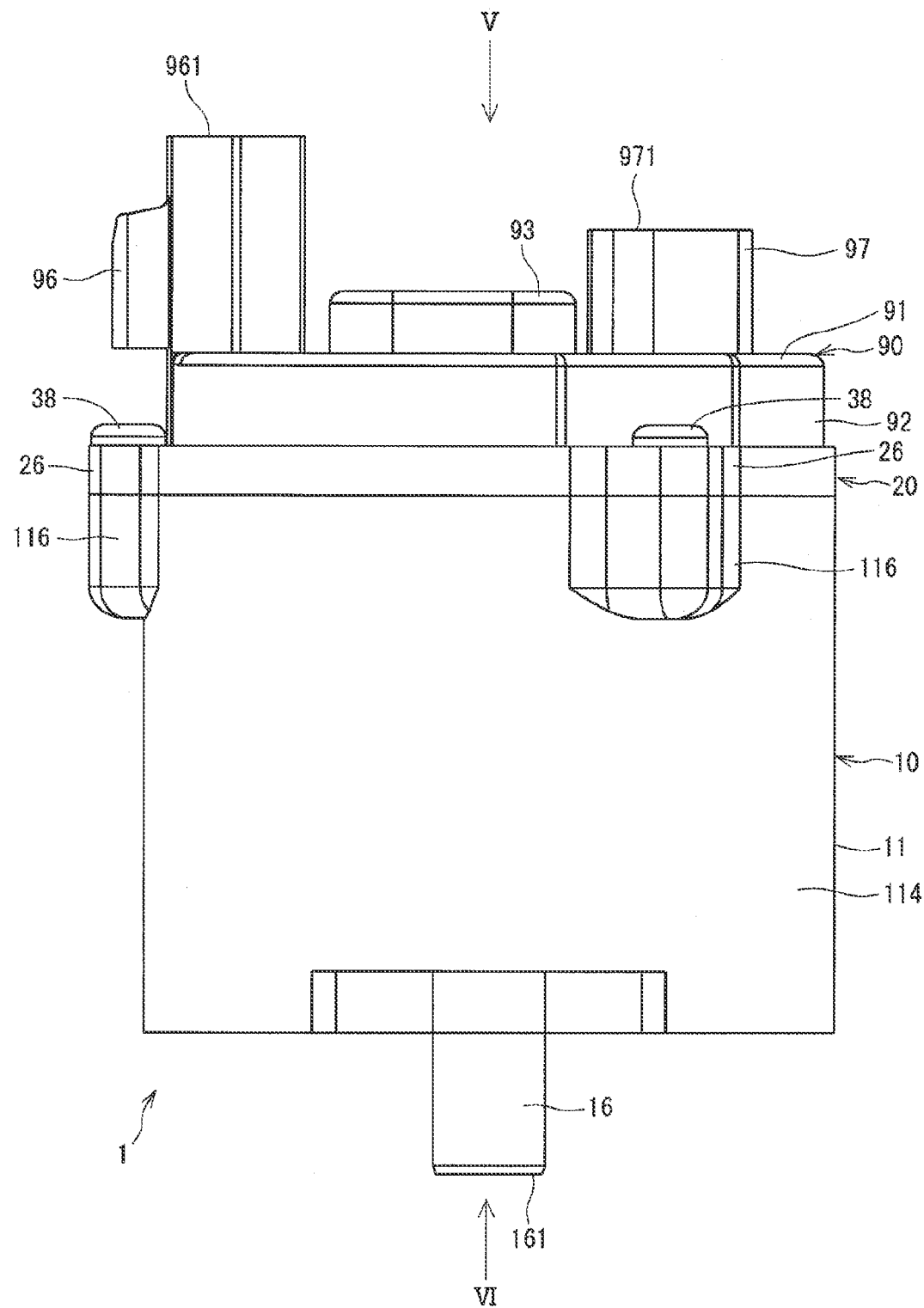
FIG. 4 is a side view of the drive device in the first embodiment of the present disclosure.
Figure 5:
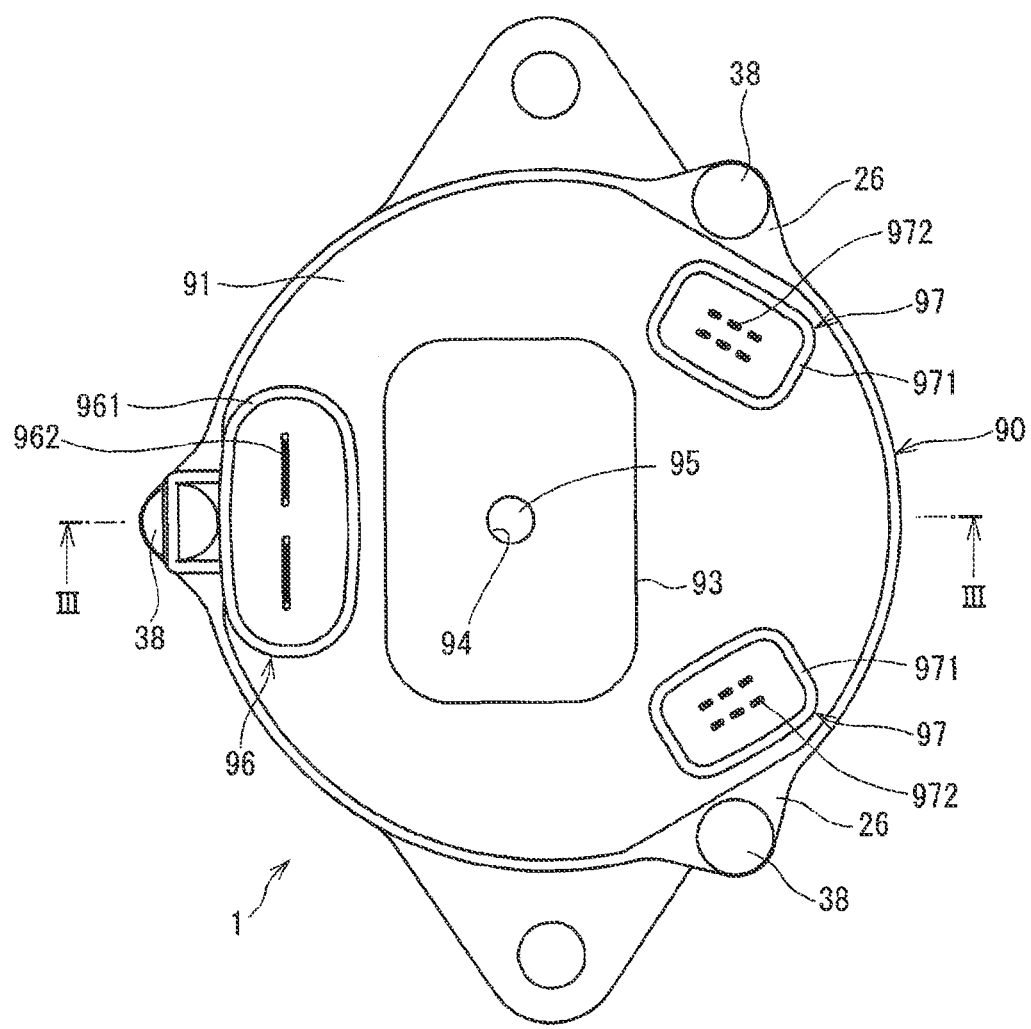
FIG. 5 is a top view of the drive device along an arrow V in FIG. 4.
Figure 6:
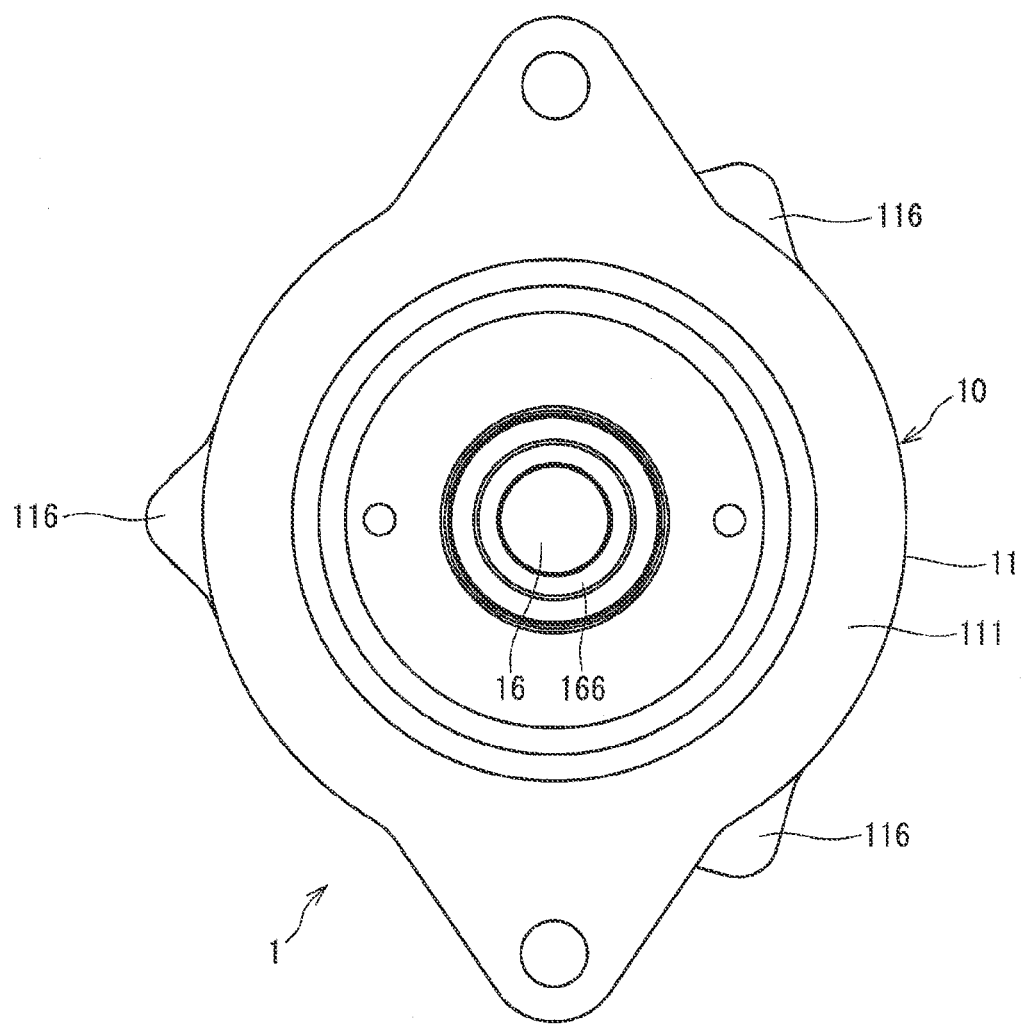
FIG. 6 is a bottom view of the drive device along an arrow VI in FIG. 4.

Next, a structure of the drive device 1 is described based on FIGS. 3-11. In the following, an axial direction, i.e., a virtual line extending along the shaft of the motor 10, may simply be designated as an "axial direction," and a radius direction, i.e., a virtual line extending outward from the shaft of the motor 10, may simply be designated as a "radius direction." FIG. 3 is a sectional view along a III-III line of FIG. 5.

As shown in FIGS. 3-8, the drive device 1 is provided with the motor 10, a frame member 20, the ECU 40, and a cover member 90, together with other parts.

As shown in FIG. 3, the motor 10 has a motor case 11, the stator 12, the first winding group 13, the second winding group 14, the rotor 15, the shaft 16 and other parts.

The motor case 11 has a bottom part 111 and a cylinder part 114, for example, is formed in a cylinder shape closed on one end, i.e., having a bottom on one end, and is made from metal, such as aluminum. The motor case 11 of the present embodiment is made from aluminum, and, as for the surface of the case 11, the anodized aluminum treatment is performed. The bottom part 111 of the motor case 11 is positioned away from the ECU 40, i.e., on an opposite side, and an opening of the motor case 11 is close to the ECU 40, i.e., on the ECU side. In the present embodiment, the cylinder part 114 corresponds to a "cylinder part of the rotating electric machine" and a projection area of the cylinder part 114 along the axial direction corresponds to a "motor region."

A shaft hole 112 into which one end 161 of the shaft 16 is inserted is disposed substantially at the center of the bottom part 111. Further, a bearing 166 is fitted to the bottom part 111.

On or around the opening of the cylinder part 114, a fixing tab 116 for fixedly disposing the substrate 20 is formed, i.e., projecting radially outward from an outer wall of the cylinder part 114. The fixing tab 116 has a screw-threaded hole 117 bored thereon. The fixing tab 116 of the present embodiment is disposed at three positions around the cylinder part 114 at the same interval.

The stator 12 has a layered part, i.e., a layered structure of a magnetizable thin metal such as iron, and an insulator disposed on a radial outside of the layered part, and the stator 12 is fixedly disposed in an inside of the motor case 11. The number of sheets of the thin metal in the layered part of the stator 12 may be changed according to the output required for the motor 10. Thereby, the output of the motor 10 can be changed by changing the axial length of the stator 12, without changing the radius length of the motor 10.

The first winding group 13 and the second winding group 14 are wound on the insulator of the stator 12. For each of the three phases, a first motor line 135 is taken out from the first winding group 13, and, for each of the three phases, a second motor line 145 is taken out from the second winding group 14. The motor lines 135 and 145 are taken out, i.e., extend, from the motor case 11 toward the ECU 40 (see FIG. 7).

In the present embodiment, the first motor line 135 corresponds to a "first extension line" and the second motor line 145 corresponds to a "second motor line".

The rotor 15 has a rotor core 151 and a permanent magnet 152. The rotor core 151 is formed in an approximately cylindrical shape, for example, and is made from a magnetic material, e.g. iron, and is coaxially arranged in an inside of the stator 12, i.e., in a radius inside of the stator 12.

The permanent magnet 152 is disposed on a radius outside of the rotor core 151, and the N poles and the S poles of the rotor core 151 alternate with each other.

The shaft 16 is formed in a rod shape, for example, with metal, and is fitted at the center position, i.e., on a rotation axis of the rotor core 151. The shaft 16 is rotatably supported by the bearing 166 fitted on the bottom part 111 of the motor case 11 and by a bearing 167 fitted on the frame member 20. Thereby, the shaft 16 is rotatable with the rotor 15. Further, an outer wall of the rotor 15 and an inner wall of the stator 12 are interposed with an air gap.

The one end 161 of the shaft 16 is inserted into the shaft hole 112 that is bored on the bottom part 111 of the motor case 11, and projects toward an outside of the motor case 11. The one end 161 of the shaft 16 serves as an output end, which is connected to the speed reduction gear 9, for outputting the torque from the motor 10 toward the column shaft 102 via the speed reduction gear 9 (see FIG. 1), even though a connection between the output end and the speed reduction gear 9 is not explicitly illustrated.

The other end 162 of the shaft 16 has a magnet holder part 17 that holds the magnet 18.

Figure 7:
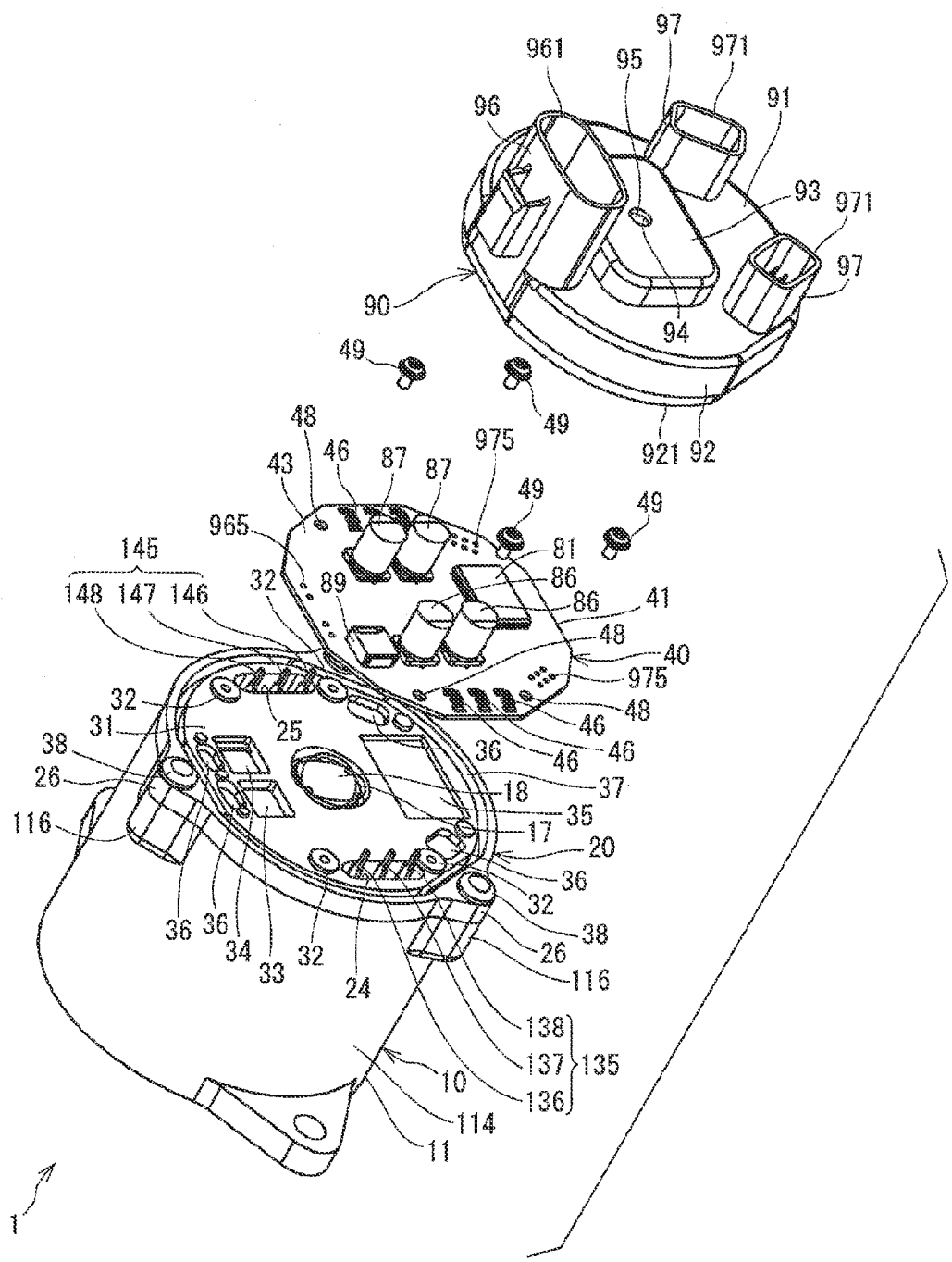
FIG. 7 is an exploded perspective view of the drive device in the first embodiment of the present disclosure.

As shown in FIG. 3 and FIG. 7, for example, the frame member 20 made from highly-heat-conductive metal, such as aluminum or the like, is formed in a lid shape for closing the opening of the motor case 11, i.e., is inserted into a radial inside of the cylinder part 114. Here, one side of the frame member 20 close to the motor 10 is designated as a motor side face 21, and the other side of the frame member 20 away from the motor 10 and close to the ECU 40 is designated as an ECU side face 31.

A shaft hole 23 is bored substantially at the center of the frame member 20. The other end 162 of the shaft 16 is inserted into the shaft hole 23.

Thereby, the magnet 18 disposed on the other end 162 of the shaft 16 is exposed to, i.e., faces, the ECU 40. The bearing 167 is fitted on the frame member 20.

Further, the frame member 20 has a motor line insertion hole 24 into which the motor line 135 is inserted and a motor line insertion hole 25 into which the motor line 145 is inserted. Thereby, the motor lines 135 and 145 are taken out therefrom to extend toward the ECU 40.

The frame member 20 has a fixing tab 26 which projects outward in a radius direction at corresponding positions (i.e., three positions in the present embodiment) corresponding to the fixing tab 116 of the motor case 11. The fixing tab 26 has a through hole 27 bored thereon. A frame lockscrew 38 " " is inserted into the through hole 27, and is tightly screwed into the screw-threaded hole 117. Thereby, the frame member 20 is fixed onto the motor case 11.

At an outer periphery of the frame member 20 and around the motor side face 21 which is close to the bottom part 111 than the fixing tab 26, an O ring groove 29 is provided, into which an O ring 39 is fitted, and the O ring 39 bound by the O ring groove 29 and the cylinder part 114 provides a watertight structure. Thereby, water and the like are prevented from intruding into the motor 10 via a position between the motor case 11 and the frame member 20.

The ECU side face 31 of the frame member 20 has a substrate fixing tab 32, relay rooms 33 and 34, an ASIC room 35, a terminal receptacle groove 36, and an adhesion groove 37.

As shown in FIGS. 3, 7-11, the ECU 40 is disposed away from the motor 10 relative to the frame member 20, i.e., with the frame member 20 interposed therebetween. The ECU 40 is positioned substantially within the motor region, and is substantially coaxially disposed with the motor 10.

The ECU 40 has the substrate 41 on which many electronic components are mounted.

The substrate 41 is formed in a shape that fits in the motor region. In the present embodiment, more practically, the substrate 41 is contained within the groove region, i.e., in a radius inside of the adhesion groove 37 provided on the ECU side face 31 of the frame member 20. In other words, the ECU components on the substrate 41, such as the SW elements 51-56, 61-66, the current detection elements 57-59, 67-69, the capacitors 86, 87, and the choke coil 89, are positioned within the motor region.

Here, one side of the substrate 41 close to the motor 10 is designated as a heat generation element mounting surface 42, and the other side, a surface away from the motor 10, is designated as an electronic component mounting surface 43.

Figure 8:
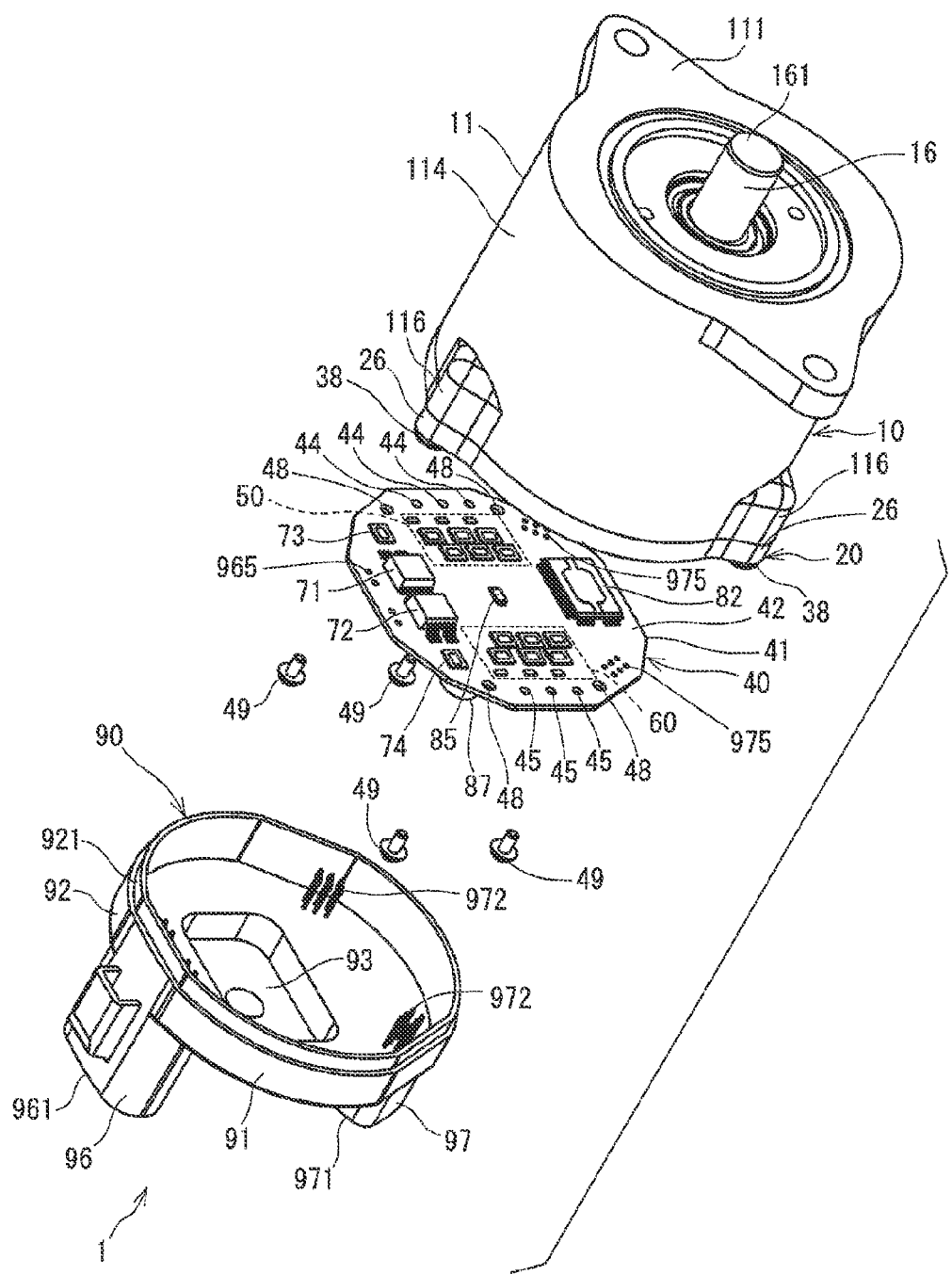
FIG. 8 is another exploded perspective view of the drive device in the first embodiment of the present disclosure.
Figure 9:
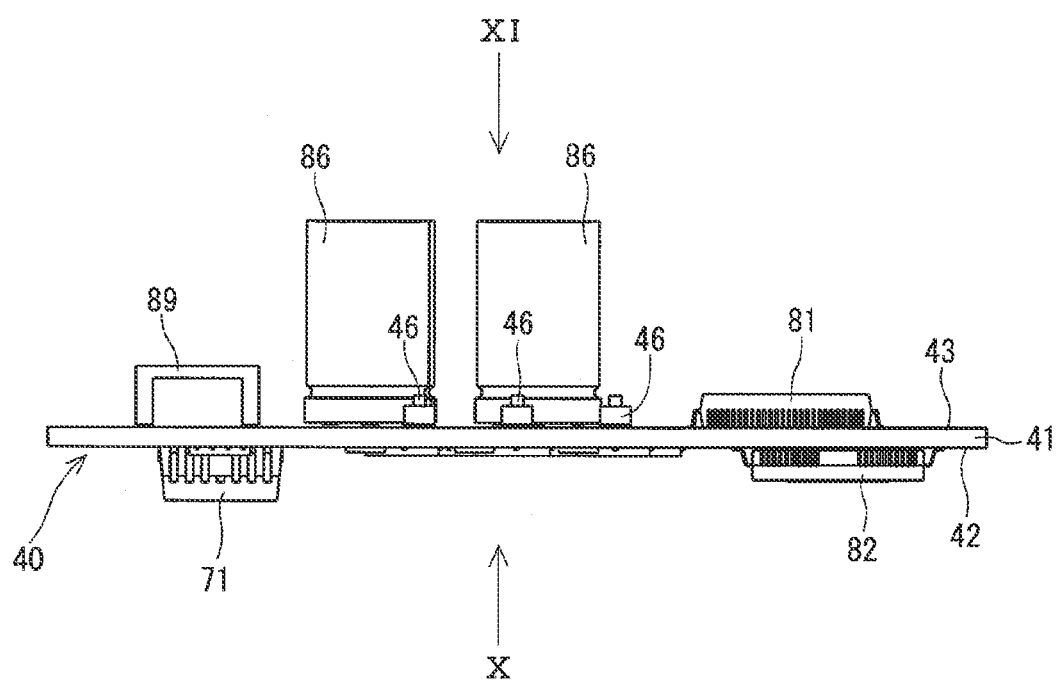
FIG. 9 is a side view of an Engine Control Unit (ECU) in the first embodiment of the present disclosure.
Figure 10:
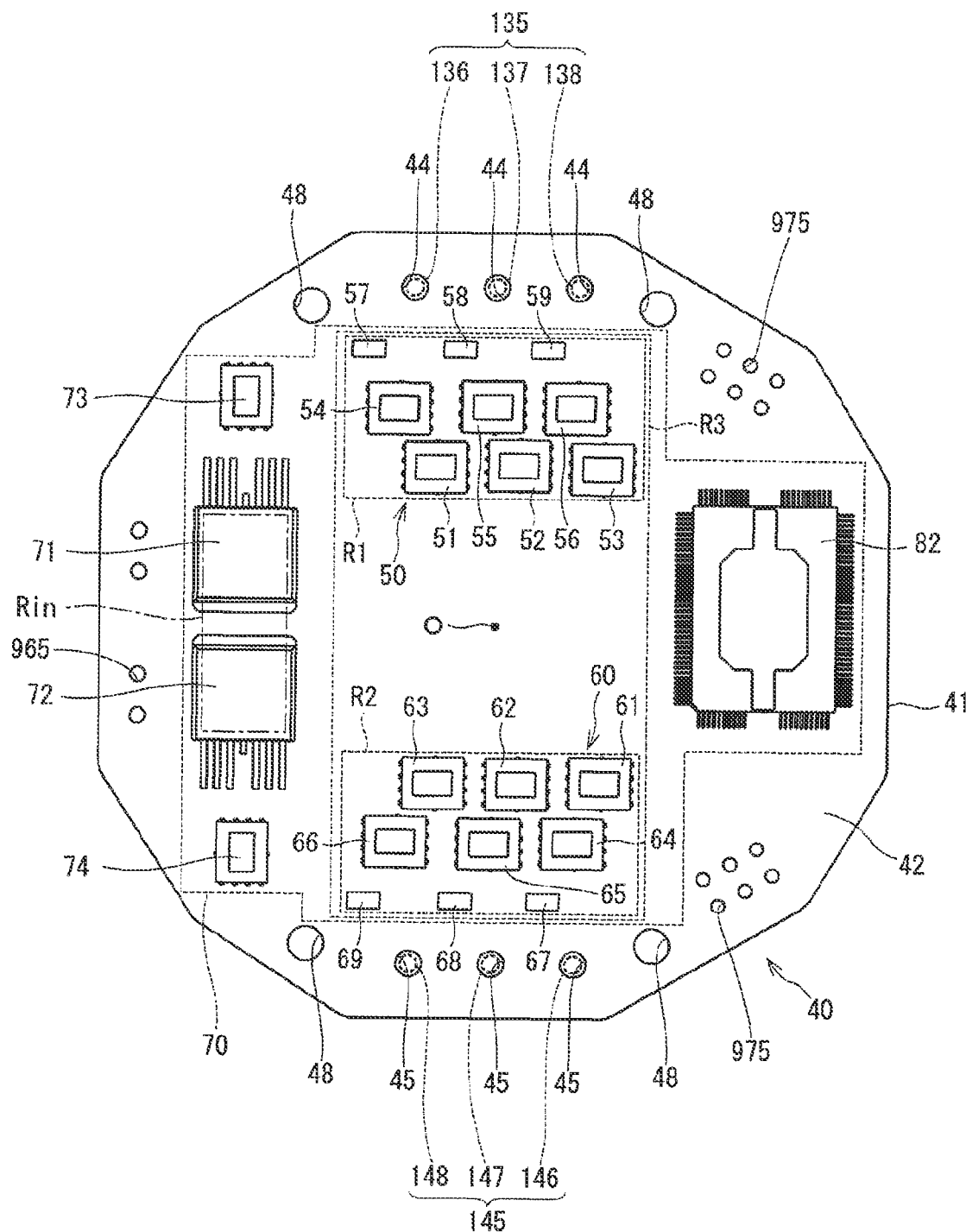
FIG. 10 is a bottom view of the ECU along an arrow X in FIG. 9.
Figure 11:
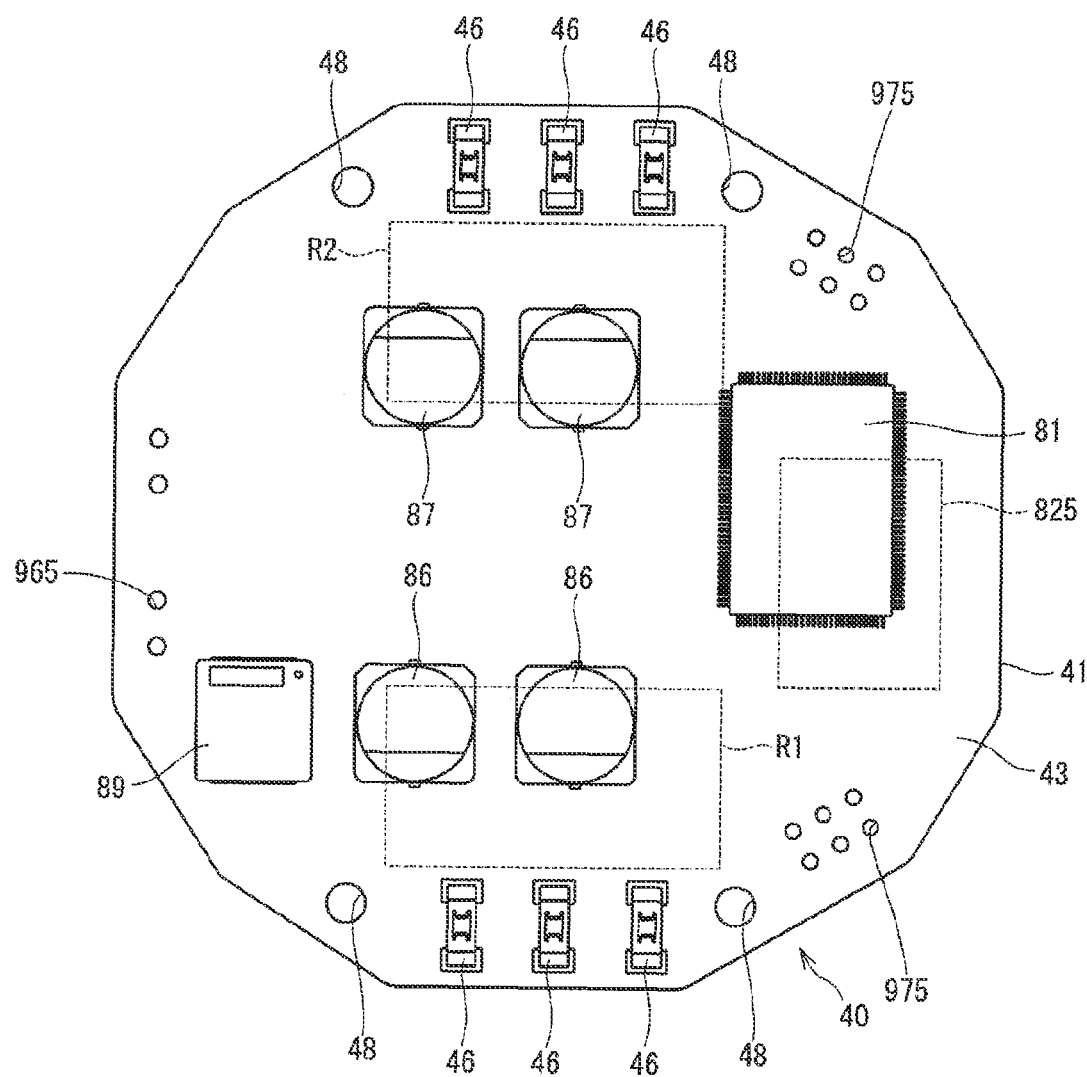
FIG. 11 is a top view of the ECU along an arrow XI in FIG. 9.

As shown in FIG. 8 and FIG. 10, for example, the SW elements 51-56, 61-66 as well as the current detection elements 57-59, 67-69, the power relays 71, 72, the reverse connection protection relays 73, 74, the ASIC 82, and the rotational angle sensor 85 are surface-mounted on the heat generation element mounting surface 42 together with other parts. The rotational angle sensor 85 is omitted from the illustration in FIG. 10. In FIG. 11, a dashed line shows a region where a mold case of the ASIC 82 is disposed.

The rotational angle sensor 85 is mounted substantially at a center position on the heat generation element mounting surface 42, which faces the magnet 18 which is exposed from the frame member 20. Here, when the axis line of the shaft 16 and its extension are considered as the center axis O of the motor 10, the rotational angle sensor 85 is mounted on the center axis O of the heat generation element mounting surface 42 (see FIG. 3).

A first region R1, where the SW elements 51-56 and the current detection elements 57-59 of the first inverter part 50 are mounted, and a second region R2, where the SW elements 61-66 and the current detection elements 67-69 of the second inverter part 60, are symmetrically arranged on the opposite sides of the center axis O of the motor 10. In the present embodiment, the SW elements 51-56 and the SW elements 61-66 are arranged as axisymmetric on both sides of a straight line passing through the center axis O of the motor 10.

Further, when a driver element region R3 is defined as an area including the first region R1 and the second region R2 and the center axis O, (i) the power supply relays 71, 72 and the reverse connection protection relays 73, 74 and (ii) the ASIC 82 are positioned outside of the driver element region R3 on opposite sides relative to the region R3. That is, the component group (i) described above is positioned on one side of the region R3, and the component (ii) described above is positioned on the other side of the region R3.

A motor line insertion section 44 is formed on a radius outside of the first region R1. The motor line insertion section 44 has the motor line 135 inserted therein. A motor line insertion portion 45 is formed on a radius outside of the second region R2. The motor line insertion portion 45 has the motor line 145 inserted therein.

In the present embodiment, the regions R1 to R3 are rectangular areas, the regions R1 to R3 may be in any shape other than the rectangular shape, depending on the implementation positions of the SW elements 51-56, 61-66 and the current detection elements 57-59, 67-69, e.g., in a polygon shape including all elements.

Further, the SW elements 54-56 connected to the low potential side are arranged on the outside of the SW elements 51-53 connected to the high potential side, and the current detection elements 57-59 are arranged further on the outside thereof.

Similarly, the SW elements 64-66 connected to the low potential side are arranged on the outside of the SW elements 61-63 connected to the high potential side, and the current detection elements 67-69 are arranged further on the outside thereof.

On one side of each of the SW elements 51-56, 61-66, the current detection elements 57-59, 67-69, the power relays 71, 72, the reverse connection protection relays 73, 74, and the ASIC 82 which are mounted on the heat generation element mounting surface 42, i.e., a side facing the frame member 20, a heat dissipation slug made of heat conductive metal, e.g., cupper, is disposed.

Further, the SW elements 51-56, 61-66, the current detection elements 57-59, 67-69, the power relays 71, 72, the reverse connection protection relays 73, 74, and the ASIC 82 respectively contact the ECU side face 31 of the frame member 20 in a heat transferable manner via a heat dissipation gel which is not illustrated. Thereby, heat generated by the SW elements 51-56, 61-66, the current detection elements 57-59, 67-69, the power relays 71, 72, the reverse connection protection relays 73, 74, and the ASIC 82 is dissipated via the heat dissipation gel to the frame member 20. In FIG. 3 or other FIGS., the ASIC 82 and the frame member 20 may look like disposed in a non-contacting state, as a result of the omission of the heat dissipation gel. That is, the SW element 51-56, 61-66, the current detection elements 57-59, 67-69, the power relays 71, 72, the reverse connection protection relays 73, 74, and the ASIC 82 constitute a heat generation element 70 in the present embodiment.

The power relays 71, 72, which are a large size element in comparison to the SW elements 51-56, 61-66 and the reverse connection protection relays 73, 74, are accommodated in the relay rooms 33, 34 provided on the ECU side face 31 of the frame member 20.

The ASIC 82, which is a large size element in comparison to the SW elements 51-56, 61-66 and the reverse connection protection relays 73, 74, is accommodated in the ASIC room 35 provided on the ECU side face 31 of the frame member 20.

In the present embodiment, the frame member 20 defines an outline of the motor 10, provides a support for the ECU 40, and provides a heat dissipation path for dissipating heat from the heat generation element 70. Thereby, as compared with a case in which a heat sink is provided separately, the number of components is reduced, and the volume of the drive device is reduced as a whole.

Here, the motor lines 135 and 145 and the phase order of the inverter parts 50 and 60 are described. According to the present embodiment, in FIG. 10, a circuit pattern of the substrate 41 connected to the drain of the power relays 71, 72 is shown in a one-dot broken line illustratively, and is designated as an electric power supply region Rin. The electric power supply region Rin is outside of the first region R1, the second region R2, and the driver element region R3 including the center axis O of the motor 10, and is a region containing the circuit pattern which supplies the electric power from the battery 109 to the first inverter part 50 and to the second inverter part 60.

According to the present embodiment, the electric power supply region Rin corresponds to a "reference position" in the claims.

As shown in FIGS. 7 and 10, the motor line 135 is made up from a first U phase motor line 136 connected to a U phase coil 131, a first V phase motor line 137 connected to a V phase coil 132, and a first W phase motor line 138 connected to a W phase coil 133. In the present embodiment, the first U phase motor line 136, the first V phase motor line 137, and the first W phase motor line 138 are arranged in order from the power supply region Rin side to be inserted in the motor line insertion section 44 of the substrate 41. In the present embodiment, the first U phase motor line 136, the first V phase motor line 137, and the first W phase motor line 138 are positioned along a straight line on an outside of the current detection elements 57-59 on the substrate 41. Further, the same interval is provided between the first U phase motor line 136 and the first V phase motor line 137, and between the first V phase motor line 137 and the first W phase motor line 138. In other words, the first U phase motor line 136 and the first W phase motor line 138 are positioned symmetrically with reference to the first V phase motor line 137.

Further, the motor line 145 is made up from a second U phase motor line 146 connected to a U phase coil 141, a second V phase motor line 147 connected to a V phase coil 142, and a second W phase motor line 148 connected to a W phase coil 143. In the present embodiment, the second W phase motor line 148, the second V phase motor line 147, and the second U phase motor line 146 are arranged in order from the power supply region Rin side to be inserted in the motor line insertion section 44 of the substrate 41. In the present embodiment, the second U phase motor line 146, the second V phase motor line 147, and the second W phase motor line 148 are positioned along a straight line on an outside of the current detection elements 67-69 on the substrate 41. Further, the same interval is provided between the second U phase motor line 146 and the second V phase motor line 147, and between the second V phase motor line 147 and the second W phase motor line 148. In other words, the second U phase motor line 146 and the second W phase motor line 148 are positioned symmetrically with reference to the second V phase motor line 147.

In the present embodiment, the first U phase motor line 136 and the second U phase motor line 146 are arranged as point-symmetric to the center axis O of the motor 10. Similarly, the first V phase motor line 137 and the second V phase motor line 147 are arranged as point-symmetric to the center axis O of the motor 10, and the first W phase motor line 138 and the second W phase motor line 148 are arranged as point-symmetric to the center axis O of the motor 10.

In such a structure, the magnetic flux leakage from the first motor line 135 and the magnetic flux leakage from the second motor line 145 cancel each other, thereby an influence of the magnetic flux leakage on the rotational angle sensor 85 mounted on the center axis O of the motor 10 is reduced. Here, "symmetry" means a substantially-symmetric arrangement of those lines, for the cancellation of the magnetic flux leakage, allowing a dimension error in the actual product.

Further, a distance between the two motor lines, i.e., between the first U phase motor line 136 and the first V phase motor line 137 or between the first V phase motor line 137 and the first W phase motor line 138, is reduced to the minimum, i.e., down to a smallest value as long as the motor lines do not contact with each other, so that the magnetic flux leakage is minimized. The same applies to the second motor line 145.

The first inverter part 50 has, in the same manner as the first motor line 135, the phase arrangement of U phase, V phase and W phase from the electric power supply region Rin side. More specifically, the SW elements 51, 52, 53 connected to the high potential side are arranged in order, from the electric power supply region Rin side, the U phase SW element 51, the V phase SW element 52, and the W phase SW element 53. Further, the SW elements 54, 55, 56 connected to the low potential side are arranged in order, from the electric power supply region Rin side, the U phase SW element 54, the V phase SW element 55, and the W phase SW element 56. Similarly, the current detection elements 57, 58, 59 are arranged in order, from the electric power supply region Rin side, the current detection element 57 which detects the electric current of the U phase coil 131, the current detection element 58 which detects the electric current of the V phase coil 132, and the current detection element 58 which detects the electric current of the W phase coil 133.

The second inverter part 60 has, in the same manner as the second motor line 145, the phase arrangement of W phase, V phase and U phase from the electric power supply region Rin side. More specifically, the SW elements 61, 62, 63 connected to the high potential side are arranged in order, from the electric power supply region Rin side, the W phase SW element 63, the V phase SW element 62, and the V phase SW element 61. Further, the SW elements 64, 65, 66 connected to the low potential side are arranged in order, from the electric power supply region Rin side, the W phase SW element 66, the V phase SW element 65, and the V phase SW element 64. Similarly, the current detection elements 67, 68, 69 are arranged in order, from the electric power supply region Rin side, the current detection element 69 which detects the electric current of the W phase coil 143, the current detection element 68 which detects the electric current of the V phase coil 142, and the current detection element 67 which detects the electric current of the U phase coil 141.

Here, the wiring length in U phase is defined as a sum of the wiring length from the electric power supply region Rin to the motor line 136, and the wiring length from the electric power supply region Rin to the motor line 146. Similarly, the wiring length in V phase is defined as a sum of the wiring length from the electric power supply region Rin to the motor line 137, and the wiring length from the electric power supply region Rin to the motor line 147. Further, the wiring length in W phase is defined as a sum of the wiring length from the electric power supply region Rin to the motor line 138, and the wiring length from the electric power supply region Rin to the motor line 148.

In the present embodiment, the first system 201 has a phase order of U, V, W phase from the electric power supply region Rin side, and the second system 202 has a phase order of W, V, U from the electric power supply region Rin side. In other words, the first system 201 and the second system 202 have the reversed phase order, in terms of the phase arrangement order of the power supply from the electric power supply region Rin side. Further, in the present embodiment, a distance from the center of the electric power supply region Rin to the center of the first region R1, and a distance from the center of the electric power supply region Rin to the center of the second region R2 are substantially the same.

Therefore, the U phase wiring length, the V phase wiring length, and the W phase wiring length vary very little. Especially, by symmetrically arranging (a) the SW elements 51-56 and the current detection elements 57-59 and (b) the SW elements 61-66 and the current detection elements 67-69, by symmetrically forming the circuit pattern on the substrate 41, and by symmetrically arranging the motor line 135 and the second motor line 145, variation of the U phase wiring length, the V phase wiring length, and the W phase wiring length is further reduced. The reduction of the wiring length thus enables a reduction of variation of wiring impedances among different phases.

Further, the phase order is the same in both of the first inverter part 50 and the first the motor line 135, and, in each phase, the SW elements 51-53 on the high potential side, the SW elements 54-56 on the low potential side, the current detection elements 57-59, and the motor lines 136-138 are respectively arranged from the center axis O side toward the radius outside on the substrate 41. In each of the SW elements 51-56, the drain is formed on the side facing the substrate 41, and the wiring pattern connected to the drain of the SW elements 54-56 on the low potential side and the motor line 135 are connected. Therefore, as compared with a case where the SW elements 51-53 on the high potential side are arranged outside, the wiring on the substrate 41 becomes easy by arranging the SW elements 54-56 on the low potential side at the outside position than the SW elements 51-53 on the high potential side.

The same applies to the second inverter part 60 and the second motor line 145.

As shown in FIG. 7 and FIG. 11, for example, the microcomputer 81, the capacitors 86, 87, and the choke coil 89 are mounted on the electronic component mounting surface 43, together with other parts. The microcomputer 81 is mounted at a position on a reverse side of the substrate 41 which at least partially overlaps with the ASIC 82.

The capacitor 86 is mounted on a reverse side of the substrate 41, i.e., at least partially overlapping with the first region R1, in which the SW elements 51-56 of the first inverter part 50 are mounted. The capacitor 87 is mounted on a reverse side of the substrate 41, i.e., at least partially overlapping with the second region R2, in which the SW elements 61-66 of the second inverter part 60 are mounted. The noise reduction effect increases by arranging the capacitors 86, 87 on the reverse side of the inverter parts 50, 60.

In the present embodiment, by mounting relatively large-size electronic components, e.g., the capacitors 86, 87 and the choke coil 89, on the electronic component mounting surface 43, the substrate 41 is positioned at a proximity of the frame member 20. Thereby, heat generated by the heat generation element 70 on the heat generation element mounting surface 42 is dissipated to the frame member 20 from the "back" of those components.

On the electronic component mounting surface 43, a motor line connector 46 made from a conductive metal or the like is provided at a position where the motor line insertion holes 44 and 45 are bored. The motor line connector 46 has a press-fit part, and the press-fit part receiving the motor lines 135 and 145 establishes an electrical connection between the substrate 41 and the motor lines 135, 145.

A hole 48 is bored at a position corresponding to the substrate fixing tab 32 of the substrate 41. A substrate lockscrew 49 (see FIGS. 7 and 8) is inserted into the hole 48, and is tightly screwed onto the substrate fixing tab 32 of the substrate 20. In such manner, the substrate 41 is fixed onto the substrate 20.

As shown in FIGS. 3-8, a cover member 90 has a cover body 91, a power supply connector 96, and a signal connector 97, and covers the electronic component mounting surface 43 side of the substrate 41.

An insert portion 921 is provided at one end of a peripheral wall 92 of the cover body 91. The insert portion 921 is inserted into the adhesion groove 37 of the frame member 20, and is fixed by the adhesive. Thereby, water or the like is prevented from intruding into the motor 10 from a connection portion between the frame member 20 and the cover member 90.

A capacitor room 93 is formed substantially at the center of the cover body 91. The capacitor room 93 protrudes from the cover body 91, i.e., away from the motor 10, for accommodating the capacitors 86, 87. A breathing hole 94 is bored on the capacitor room 93. The breathing hole 94 is closed by a filter member 95 attached thereon. The filter member 95 is made from a material that passes air but does not pass the water. By having the filter member 95 in the breathing hole 94, the inner pressure of the driver unit 1 stays constant at a certain value even when the temperature changes.

The power supply connector 96 and the signal connector 97 (i.e., "connectors 96 and 97" hereinafter) respectively protrude away from the cover body 91, i.e., away from the motor 10. In the present embodiment, the connectors 96 and 97 are integrally formed with the cover body 91 in one body.

The power supply connector 96 has an opening 961 disposed on one end which extends away from the motor 10, for a connection to a harness (not illustrated) that extends from the battery 109. Further, the power supply connector 96 has a power supply connector terminal 962 connected to the substrate 41. The power supply connector terminal 962 is inserted into a terminal insertion hole 965 bored on the substrate 41, and is connected to the substrate 41 by solder or the like. Thereby, the ECU 40 is connected to the battery 109.

The signal connector 97 has an opening 971 disposed on one end which extends away from the motor 10, for a connection to a harness (not illustrated). In the present embodiment, two signal connectors 97 are provided, among which one is connected to a harness extending from the torque sensor 103 and the other is connected to a harness extending from CAN. Further, the signal connector 97 has a signal connector terminal 972 connected to the substrate 41. The signal connector terminal 972 is inserted into a terminal insertion hole 975 disposed on the substrate 41, and is connected to the substrate 41 by solder or the like. Thereby, information from the torque sensor 103 and information from CAN are input into the ECU 40.

The tip of each of the power supply connector terminal 962 and the signal connector terminal 972 (i.e., "terminals 962 and 972" hereinafter) is inserted into the terminal receptacle groove 36 that is formed on the ECU side surface 31 of the substrate 20, so that the terminals 962, 972 and the frame member 20 are not short-circuited with each other.

As described in full detail above, the drive device 1 of the present embodiment is provided with the motor 10, the substrate 41, the SW elements 51-56, the SW elements 61-66, the first the motor line 135, and the second the motor line 145.

The motor 10 is a three-phase motor in which the stator 12 having the first winding group 13 and the second winding group 14 wound thereon, the rotor 15 rotatable relative to the stator 12, and the shaft 12 rotating with the rotor 15 are provided.

The substrate 41 is disposed on one end side of the shaft 16 of the motor 10.

The SW elements 51-56 constituting the first inverter part 50 that switches the power supply to the first winding group 13 is arranged on the heat generation element mounting surface 42 which is one surface of the substrate 41.

The SW elements 61-66 constituting the second inverter part 60 that switches the power supply to the second winding group 14 are mounted on the same surface of the substrate 41 as the SW elements 51-56, and is arranged in the second region R2, which is on an opposite side of the first region R1 relative to the axial center O of the motor 10, in which the SW elements 51-56 are mounted.

The first the motor line 135 is taken out from each of the plural phases of the first winding group 13, and is arranged on the substrate 41.

The second the motor line 145 is taken out from each of the plural phases of the second winding group 14, and is arranged on the substrate 41.

The phase order from the electric power supply region Rin side on the substrate 41 is reversed, in a first group of the first motor line 135 and the SW elements 51-56, and in a second group of the second motor line 145 and the SW elements 61-66.

In other words, if U, V, W phases are respectively designated as the first, the second, and the third phases, the order of the phases in the first group of the first motor line 135 and the SW elements 51-56 are, from the electric power supply region Rin side, the first phase (=U phase), the second phase (=V phase), and the third phase (=W phase), and the order of the phases in the second group of the second motor line 145 and the SW elements 61-66 are, from the electric power supply region Rin side, the third phase (=W phase), the second phase (=V phase), and the first phase (=U phase).

According to the present embodiment, the phase order from the reference position side (i.e., in the present embodiment, the electric power supply region Rin side) is in a reverse order (i) in the first group of the first motor line 135 and the SW elements 51-56 which is the first system 201, and (ii) in the second group of the second motor line 145 and the SW elements 61-66 which is 1 to the second system 202. In such manner variation of the wiring lengths in different phases on the substrate 41 is reduced, thereby reducing variation of the impedance among the different phases.

The reference position is the electric power supply region Rin, which is an outside of the first region R1, the second region R2, and the driver element region R3 including the center axis O of the motor 10, and is a region containing the circuit pattern which supplies the electric power from the battery 109 to the first inverter part 50 and to the second inverter part 60. That is, in the present embodiment, the arrangement of the first motor line 135 and the SW elements 51-56 and the arrangement of the second motor line 145 and the SW elements 61-66 are reversed to each other in terms of the phase order from the Rin side. Therefore, the variation of the wiring lengths for a portion the wire extending from the electric power supply region Rin to the motor lines 135, 145 is reduced, the variation of the impedances in each of the plural phases is reduced.

The drive device 1 is further provided with the power relays 71, 72 that are capable of switching the supply of the electric current from the battery 109 to the first inverter part 50 or to the second inverter part 60. The power relays 71, 72 are mounted in the electric power supply region Rin on the heat generation element mounting surface 42, which is the surface having the SW elements 51-56, 61-66. By arranging the power relays 71, 72 in the electric power supply region Rin, the wiring on the substrate 41 is made easy, and a mounting area of the substrate 41 is efficiently utilized.

The drive device 1 is further provided with the frame member 20 that is disposed at a position between the motor 10 and the substrate 41.

The SW elements 51-56, 61-66 are mounted on the heat generation element mounting surface 42 which is a surface of the substrate 41 facing the frame member 20 in a heat dissipatable manner to dissipate heat to the frame member 20. That is, the frame member 20 serves as an outline of the motor 10, and serves as a heat sink. In such manner, the volume of the drive device 1 is reduced, especially along the axial direction, in comparison to a case in which the heat sink is separately provided, due to the reduction of the number of the components.

The first motor line 135 is connected to the substrate 41 on the radius outside of the first region R1. The second motor line 145 is connected to the substrate 41 on the radius outside of the second region R2. Thereby, the mounting area of the substrate 41 is efficiently utilized.

The drive device 1 is further provided with the current detection elements 57-59, 67-79 which detect the power supply to each of the phases in the first winding group 13 or the second winding group 14. The current detection elements 57-59, 67-79 are mounted at positions between the SW elements 51-56 and the first motor line 135, or the positions between the SW elements 61-66 and the second motor line 145 on the same surface of the substrate 41 as the SW elements 51-56, 61-66.

Thereby, the detection of the electric current is appropriately performed in the first winding group 13 or in the second winding group 14.

As for the SW elements 51-56, 61-66, the SW elements 51-53, 61-63 on high potential side are arranged close to the axial center O of the motor 10, and the SW elements 54-56, 64-66 on the low potential side are arranged on the outside of the SW elements 51-53, 61-63 on the high potential side. By arranging the SW elements in such way, the wiring on the substrate 41 becomes easy as compared with a case in which the SW elements 51-53, 61-63 on the high potential side are arranged on the outside.

The first motor line 135 and the second motor line 145 are arranged as point-symmetric with reference to the center axis O of the motor 10 on the substrate 41. Thereby, the corresponding phases of the first motor line 135 and the second motor line 145 are arranged as point-symmetric, thereby cancelling the magnetic flux leakage with each other and reducing the total magnetic flux leakage. Further, when the rotational angle sensor 85 is arranged on the center axis O of the motor 10, for example, the detection error of the rotational angle sensor 85 under the influence of the magnetic flux leakage is reduced.

For the first motor line 135 and the second motor line 145, the center phase of the three phases serves as a reference phase for the both side phases. That is, in the first motor line 135 and the second motor line 145, the V phase serves as a standard phase for the symmetrical arrangement of the U phase and the W phase on both sides. Thereby, variation of the wiring lengths among the different phases is reduced, and variation of the impedance among the different phases is further reduced.

On the substrate 41, the motor lines 136, 137, and 138 are arranged along a straight line.

On the substrate 41, the motor lines 146, 147, and 148 are arranged along a straight line.

The drive device 1 of the present embodiment is applied to the electric power steering device 8. That is, the electric power steering device 8 is provided with the drive device 1 and the speed reduction gear 9 which transmits a torque outputted from the motor 10 to the column shaft 102, drives the column shaft 102 by the torque of the motor 10, and assists the steering operation of the steering wheel 101 by a driver.

The drive device 1 of the present embodiment has the motor 10 and the ECU 40 substantially coaxially disposed, has a reduced product volume along the axial direction, and is substantially contained within the motor region. Thereby, the drive device 1 is installable even in a small space. Further, since the O ring 39 is disposed at a position between the motor case 11 and the substrate 20 and the substrate 20 and the cover member 90 are attached with the adhesive, the drive device 1 of the present embodiment has a waterproof construction. Therefore, the drive device 1 may be installed in an engine room, for example. In other words, the drive device 1 is suitably used for a rack assistant type electric power steering device.

Second Embodiment

Figure 12:
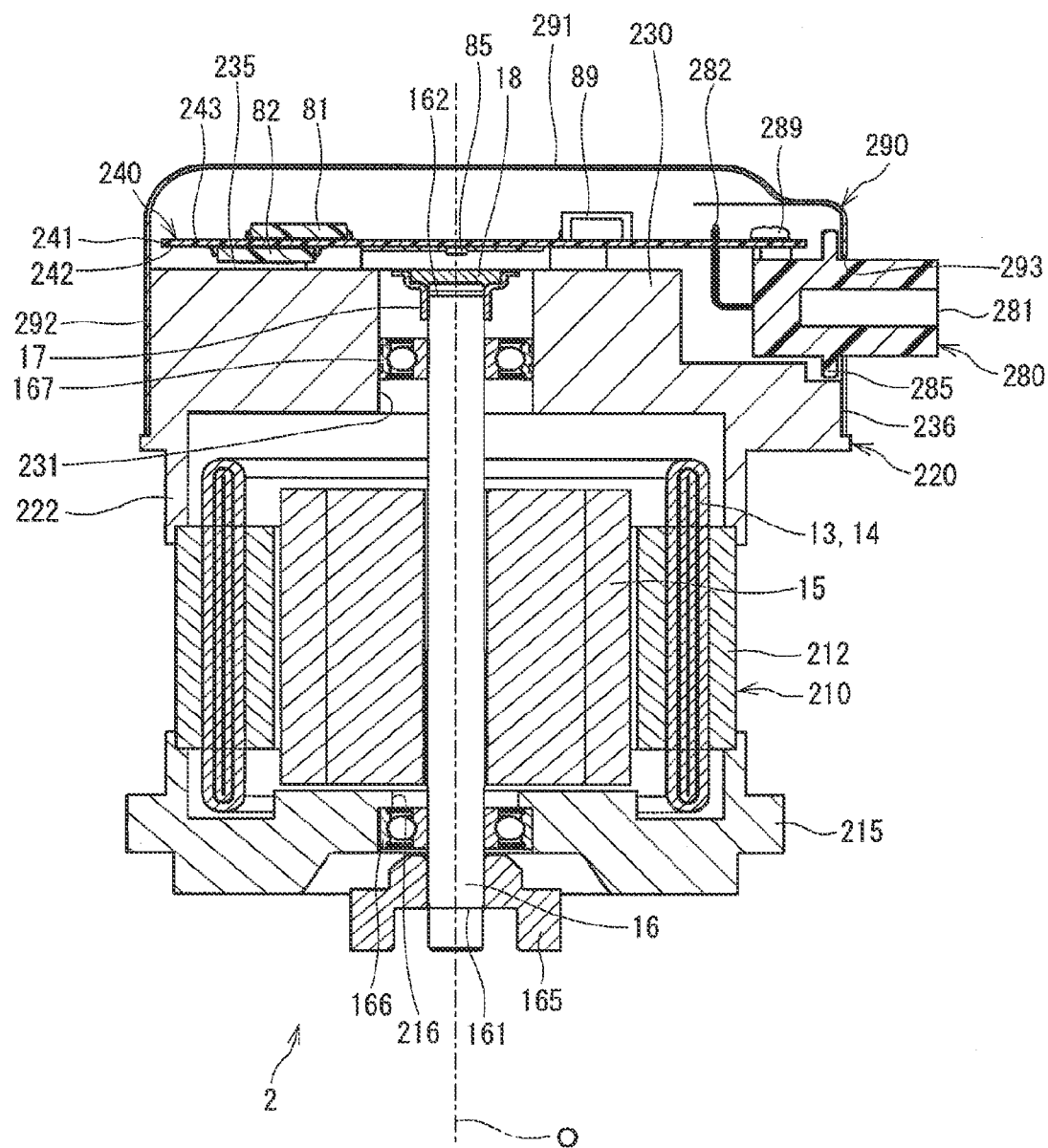
FIG. 12 is a sectional view of the drive device in a second embodiment of the present disclosure.
Figure 13:
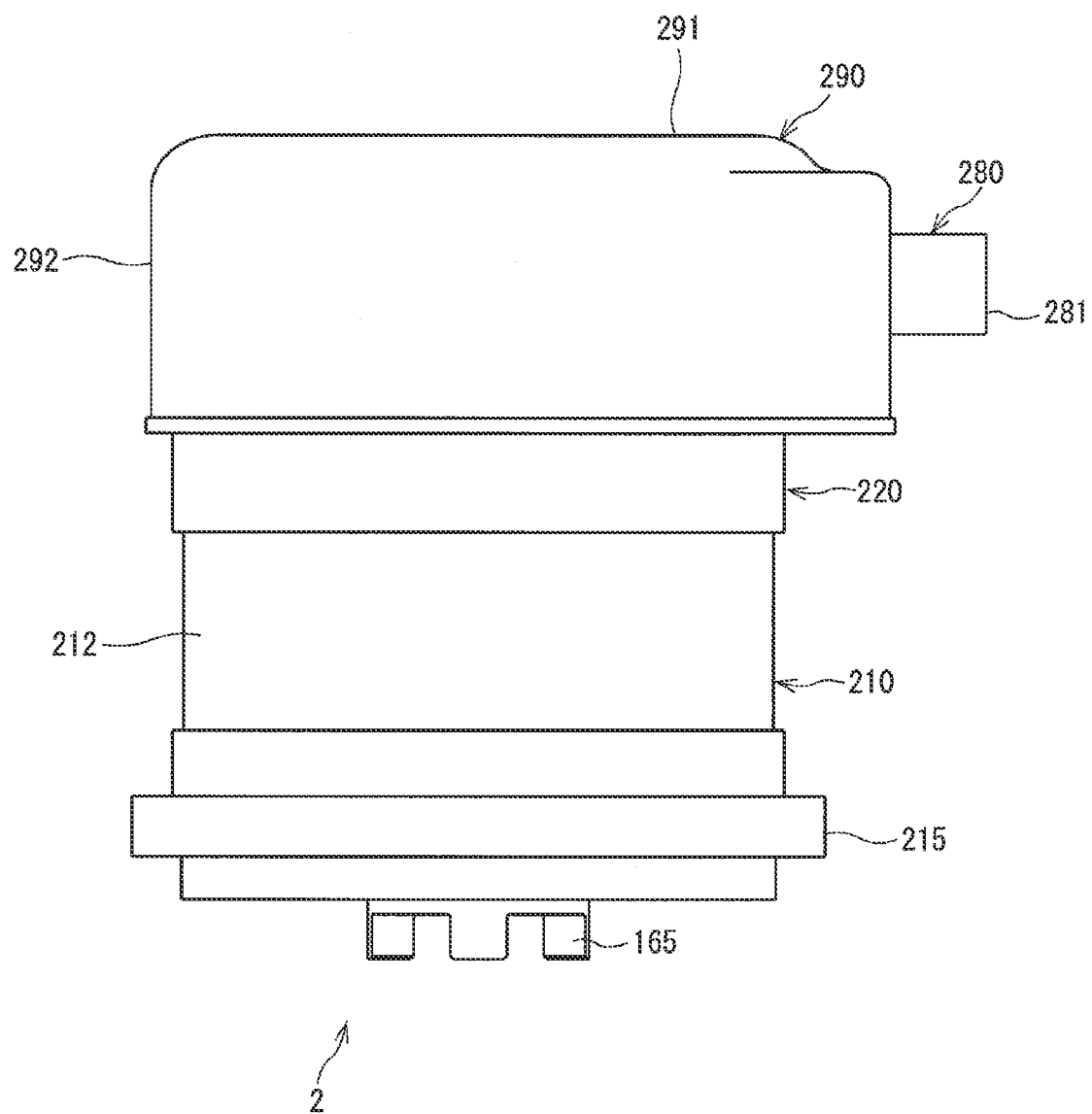
FIG. 13 is a side view of the drive device in the second embodiment of the present disclosure.
Figure 14:
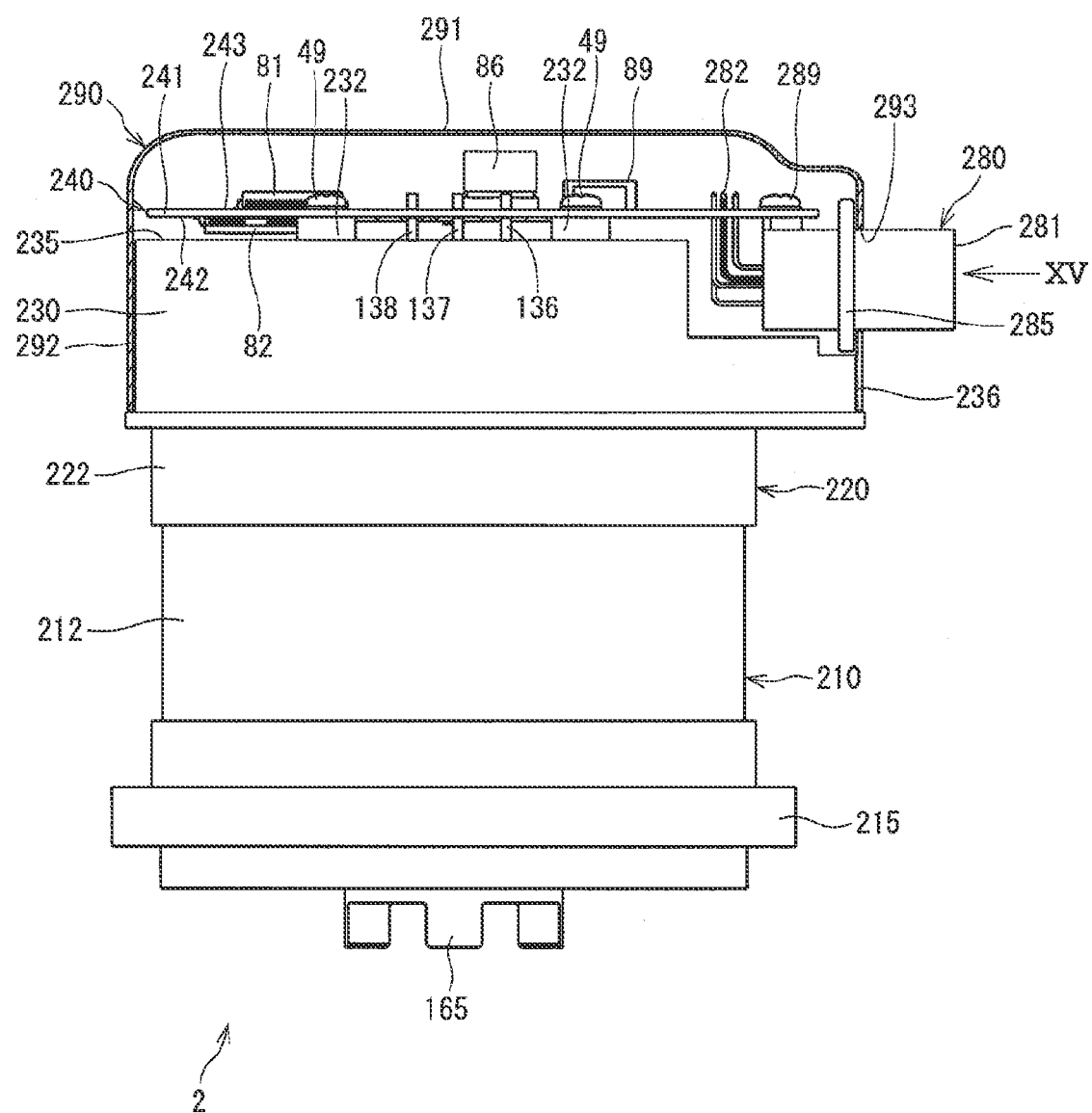
FIG. 14 is a side view of the drive device in which a part of a cover member in FIG. 13 is removed.
Figure 15:
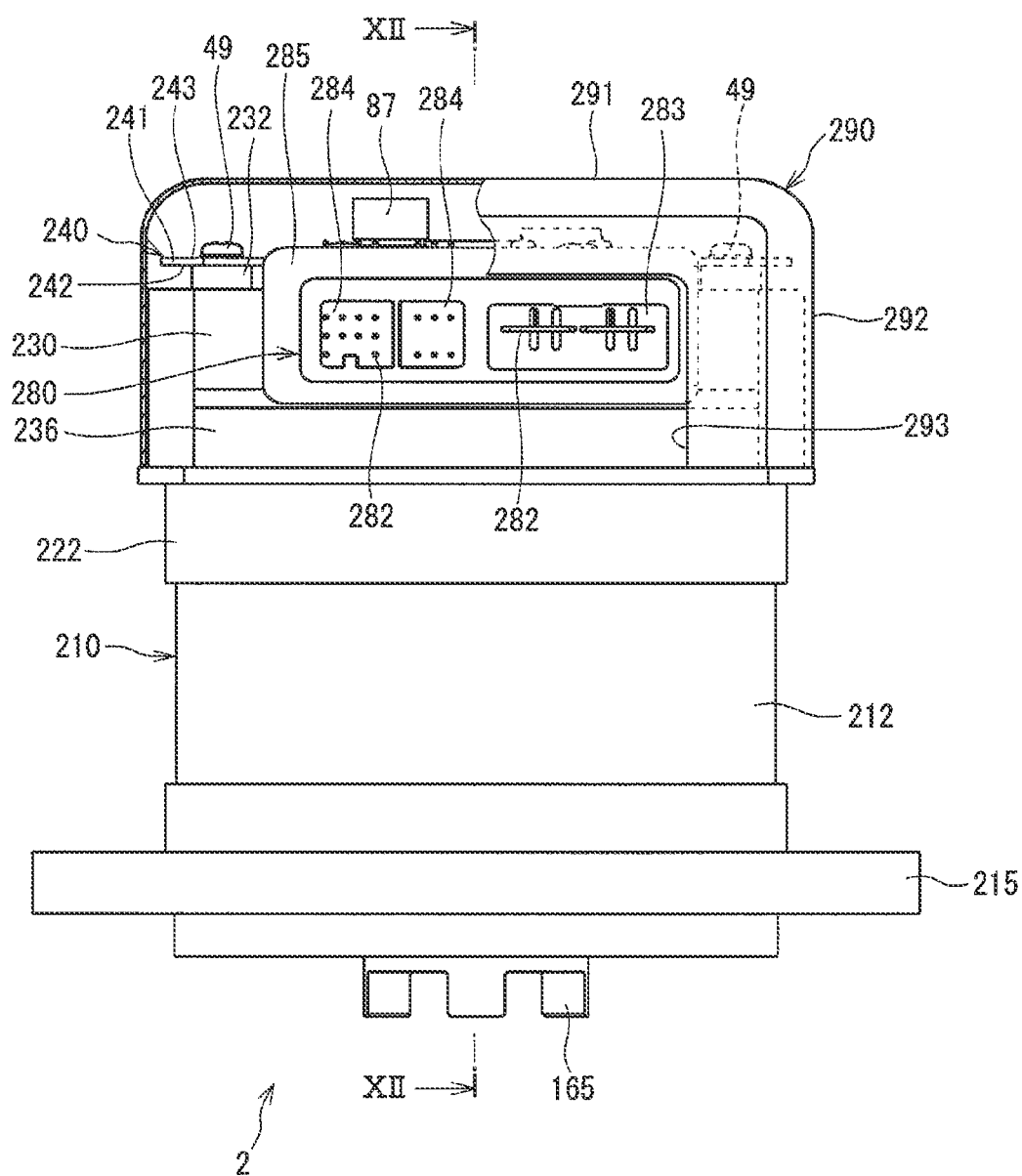
FIG. 15 is a side view of the drive device along an arrow XV in FIG. 14 in which a part of the cover member is removed.

The drive in the second embodiment of the present embodiment is shown in FIGS. 12-17. FIG. 12 is a sectional view of the drive device along a XII-XII line of FIG. 15. In each of the drawings concerning the present embodiment, the capacitors 86 and 87 are omitted in some case.

A drive device 2 is provided with a motor 210 as a rotating electric machine, a front frame end 215, a rear frame end 220, an ECU 240 as a controller, a connector 280, a cover member 290 and the like. According to the present embodiment, the rear frame end 220 corresponds to a "substrate" in the claims. Since the electric configuration of the drive device 2 is the same as that of the above-mentioned embodiment, description of the electric configuration is omitted.

The motor 210 is provided with a stator 212, the rotor 15, the shaft 16 and the like as shown in FIGS. 12-15.

The stator 212 has the front frame end 215 and the rear frame end 220 fixed thereto. In the present embodiment, a motor case is omitted and the stator 212 is exposed. About the other points, the stator 212 is the same as the stator 12 in the above-mentioned embodiment. That is, in the drive device 2 of the present embodiment, the stator 212 is "naked" and does not have a waterproof construction. Therefore, the drive device 2 of the present embodiment may preferably be disposed in a vehicle compartment, and is preferably applicable to a column assistance type electric power steering device.

According to the present embodiment, since the motor case is omitted, a projection region, or a "silhouette", of the stator 212 is considered as a "motor region."

The front frame end 215 is made from, for example, metal, e.g. aluminum or the like, and is provided on the opposite end of the motor 210 relative to the ECU 240. The front frame end 215 has a shaft hole 216 bored substantially at the center thereof. The bearing 166 is attached to the front frame end 215, and one end 161 of the shaft 16 is inserted thereinto. The one end 161 of the shaft 16 is exposed from the front frame end 215. The one end 161 of the shaft 16 is provided as an output end 165. The output end 165 is connected to the speed reduction gear 9. Thereby, the torque generated by the rotation of the rotor 15 and the shaft 16 is output to the column shaft 102 via the speed reduction gear 9.

As shown in FIGS. 12-15, the rear frame end 220 has a frame part 222, a heat dissipator 230, and a connector receiver 236, for example, and is made with thermally-conductive metal, e.g. aluminum or the like, and is disposed on the ECU 240 side of the motor 210. The front frame end 215 and the rear frame end 220 are combined by using a through bolt (not illustrated), with the motor 210 interposed therebetween. Further, the rear frame end 220 has a motor line insertion hole (not illustrated) bored thereon. The motor lines 135 and 145 are inserted into the motor line insertion hole, and are taken out to extend toward the ECU 240.

The frame part 222 has a ring shape, and is attached to the stator 212 of the motor 210.

The heat dissipator 230 is fixed and stands up on the frame part 222 to extend toward the ECU 240.

A shaft hole 231 is bored at the center axis O of the heat dissipator 230. The shaft hole 231 has a bearing 167 disposed therein, and an other end 162 of the shaft 16 is inserted thereinto. Thereby, the magnet 18 provided on the other end 162 of the shaft 16 is exposed to the ECU 240.

A substrate fixing part 232 is provided on an outside of the heat dissipator 230. An ECU 240 side surface of the heat dissipator 230 is formed as a radiation surface 235.

The connector receiver 236 protrudes from the heat dissipator 230 toward a radius outside thereof. Next to the connector receiver 236, a connector 280 is disposed on the ECU 240 side. The connector receiver 236 and the connector 280 are separated with a gap in between.

The ECU 240 is disposed on an opposite side of the rear frame end 220 relative to the motor 210, and is positioned substantially co-axially with the motor 210.

The ECU 240 has a substrate 241 on which various electronic components are mounted.

The substrate 241 takes a shape that fits in the projection region of the rear frame end 220. Further, the components of the ECU 240, i.e., the SW elements 51-56, 61-66, the current detection elements 57-59, 67-69, the capacitors 86, 87, and the choke coil 89 which are mounted on the substrate 241, are contained within the motor region.

Here, a motor side surface of the substrate 241, which faces the motor 210, is designated as a heat generation element mounting surface 242, and an opposite surface of the substrate 241, which faces away from the motor 210, is designated as an electronic component mounting surfaces 243. In the present embodiment, the heat generation element mounting surface 242 corresponds to a "one surface" in the claims.

Figure 16:
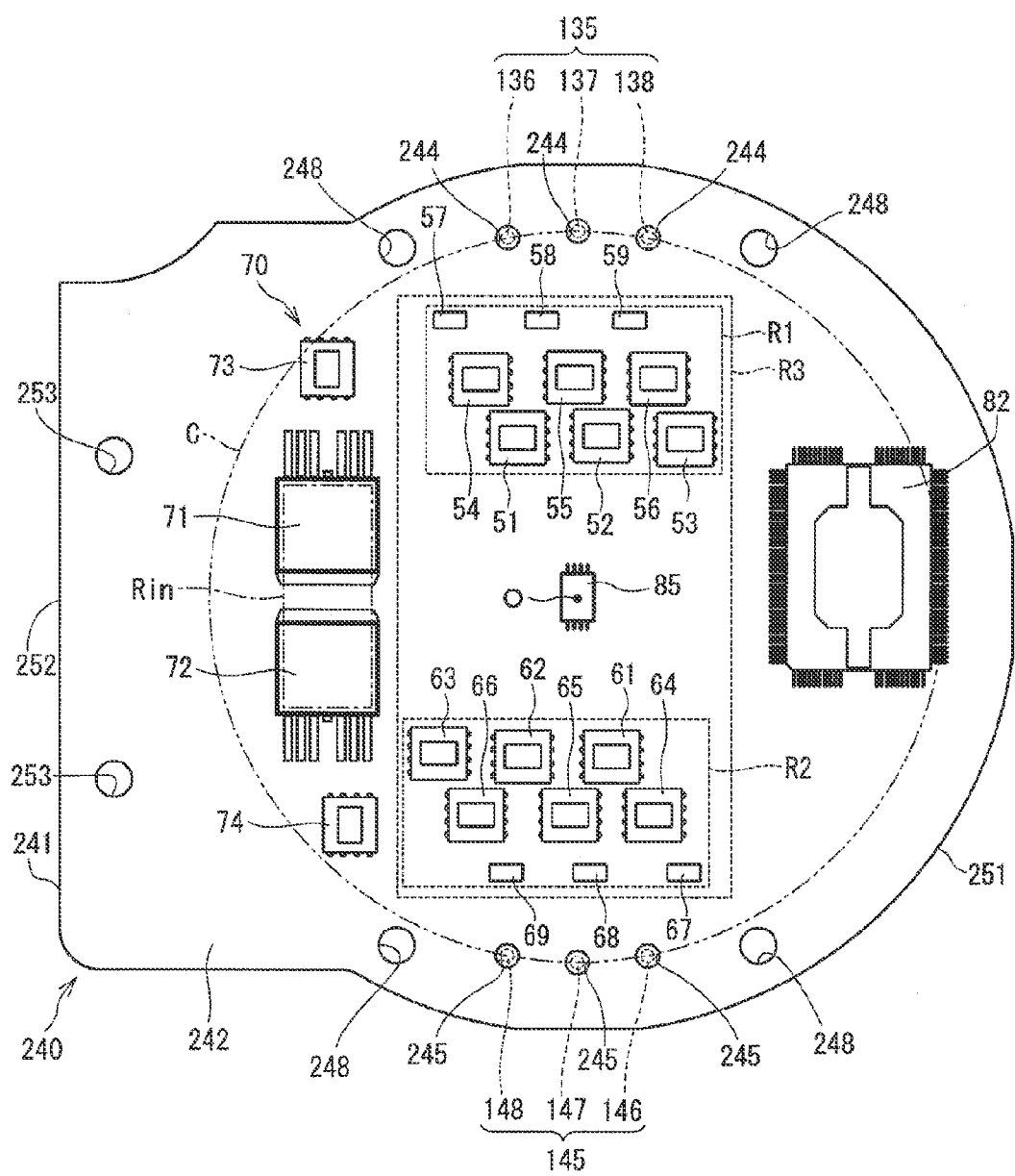
FIG. 16 is a plan view of a frame member side surface of a substrate in the second embodiment of the present disclosure.
Figure 17:
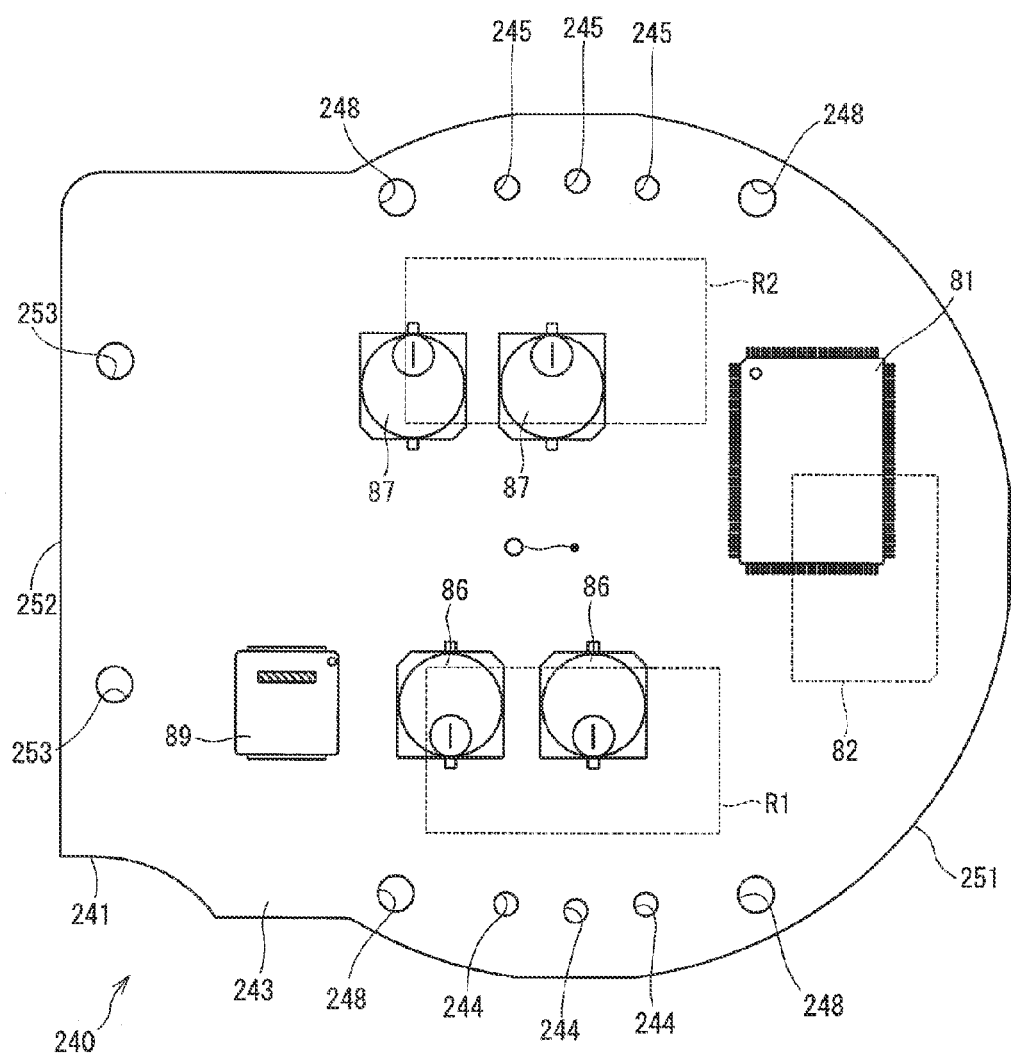
FIG. 17 is a plan view of an opposite side surface of the substrate in the second embodiment of the present disclosure.

As shown in FIG. 16, the heat generation element mounting surface 242 has the SW elements 51-56, 61-66, the current detection elements 57-59, the power relays 71, 72, reverse connection protection relays 73, 74, the ASIC 82, the rotational angle sensor 85 and the like mounted thereon.

In the present embodiment, the SW elements 51-56, 61-66, the current detection elements 57-59, 67-69, the power relays 71, 72, the reverse connection protection relays 73, 74, and the ASIC 82 respectively contact the radiation surface 235 of the heat dissipator 230 of the rear frame end 220 via the heat dissipation gel in a heat dissipatable manner. Thereby, heat generated by the SW elements 51-56, 61-66, the power relays 71, 72, the reverse connection protection relays 73, 74, and the ASIC 82 is dissipated to the rear frame end 220 via the heat dissipation gel. Further, on the electronic component mounting surface 243, the microcomputer 81 is mounted in a region which at least partially overlaps with the ASIC 82, (refer to FIG. 12 and FIG. 17).

In the present embodiment, the SW elements 51-56 constituting the first inverter part 50 and the SW elements 61-66 constituting the second inverter part 60 are symmetrically arranged around the center axis O of the motor 10 (i.e., a part where the rotational angle sensor 85 is disposed in the present embodiment). In the present embodiment, the SW elements 51-56 and the SW elements 61-66 are arranged around center axis O of the motor 10 in a point-symmetric manner. In addition, the phase order is arranged in the same manner as the above-mentioned embodiment, i.e., U, V, W phases in order from the electric power supply region Rin side in the first inverter part 50, and the W, V, U phases in order from the electric power supply region Rin side in the second inverter part 60.

The arrangement and other matter not mentioned above regarding the electronic components on the substrate 241 are also the same as the above-mentioned embodiment.

A motor line insertion section 244 is bored at a radius outside position at a more outer part of the substrate 41 than that of the first region R1 where the elements constituting the first inverter part 50 on the substrate 241 are mounted, relative to the center axis O. The motor line 135 is inserted into the motor line insertion section 244, and is connected to the section 244 by solder or the like.

A motor line insertion section 245 is bored at a radius outside position at a more outer part of the substrate 41 than the second region R2 where the elements constituting the second inverter part 60 on the substrate 241 are mounted, relative to the center axis O. The motor line 145 is inserted into the motor line insertion section 245, and is connected to the section 245 by solder or the like.

The motor line insertion sections 244 and 245 are positioned on a circle C that is centered on the center axis O. That is, the motor lines 135 and 145 are arranged on the substrate 241 on the circle C. In the present embodiment, the motor lines 135 and 145 are taken out from the winding groups 13 and 14 winding wire of which is wound on the stator 212 having a ring shape. By arranging the motor line insertion sections 244 and 245 on the same circle, the motor lines 135 and 145 extend straight from the stator 212 toward the substrate 41, thereby making it easy for the motor lines 135 and 145 to be connected to the substrate 241.

A hole 248 is bored at a position corresponding to the substrate fixing part 232 of the substrate 241. A substrate lockscrew 49 is inserted into the hole 248, and is screwed onto the substrate fixing part 232 of the rear frame end 220. Thereby, the substrate 241 is fixed onto the rear frame end 220.

The substrate 241 has an arc part 251 having an arc shape and a connector fixing part 252 disposed on a radius outside of the arc part 251. The connector fixing part 252 has a hole 253 bored thereon into which a connector lockscrew 289 is inserted.

The connector fixing part 252 is positioned outside of the power relays 71, 72 and the reverse connection protection relays 73, 74 on the heat generation element mounting surface 242 of the substrate 241, and the connector 280 is positioned on the connector fixing part 252.

As shown in FIGS. 12-15, the connector 280 is fixed onto the substrate 241 by the connector lockscrew 289 inserted from the electronic component mounting surface 243 side of the substrate 241.

The connector 280 is made from resin or similar material, is disposed to protrude radially outwardly from the substrate 241, and is positioned on the ECU 240 side facing the rear frame end 220 within proximity of the connector receiver 236, i.e., the connector 280 is positioned between the rear frame end 220 and the ECU 240. In other words, the connector 280 is positioned on the ECU 240 side of the frame part 222, near the connector receiver 236 of the rear frame end 220, and more closely describes how the connector 280 is positioned on the controller side of the frame member."

In the present embodiment, the connector 280 is positioned on the heat generation element mounting surface 242 side of the substrate 241, which is beneficial for heat dissipation, because the heat dissipator 230 can rise up from the rear frame end 220 by the height of the connector 280, expanding a heat dissipation surface area and increasing a heat mass dissipated therefrom. That is, heat generated by the heat generation element 70 may be efficiently dissipated from the heat dissipator 230.

An opening 281 of the connector 280 faces outward, and is connectable to a harness incoming from radius outside of the drive device 2. Further, the connector 280 has a terminal 282. The terminal 282 is connected to the substrate 241.

The connector 280 of the present embodiment has a power supply connector 283 and a signal connector 284, which are integrally combined to have one body. The outer periphery of the connector 280 is formed as a flange 285.

A cover member 290 is made from metallic material, and is formed to have a separate body from the connector 280. The cover member 290 has a top part 291 and a side wall 292 formed along the periphery of the top part 291, and covers the ECU 240, and is fixed onto the rear frame end 220 by caulking or the like.

The side wall 292 has a notch 293 suitably formed to accommodate the connector 280. The opening 281 side of the connector 280 is thus exposed from the cover member 290.

In the present embodiment, the flange 285 has a motor side face exposed from the cover member 290, based on an assumption that the motor 10 is positioned on a vertically-lower side in the drive device 2 after installation into the vehicle. By disposing the flange 285, water or the like is prevented from intruding into the inside of the drive device 2 via a connection part between the cover member 290 and the connector 280. Further, water permeated in the inside is transported toward an outside of the drive device 2 along the flange 285.

In the present embodiment, the first motor line 135 and the second motor line 145 are arranged on the same circle on the substrate 241. Therefore, the connection between the first/second motor lines 135, 145, which extend from the first/second winding groups 13, 14, and the substrate 241 is easily established. Further, the configuration of the present embodiment also achieves the same effects as the above-mentioned embodiment.

Third Embodiment

Figure 18:
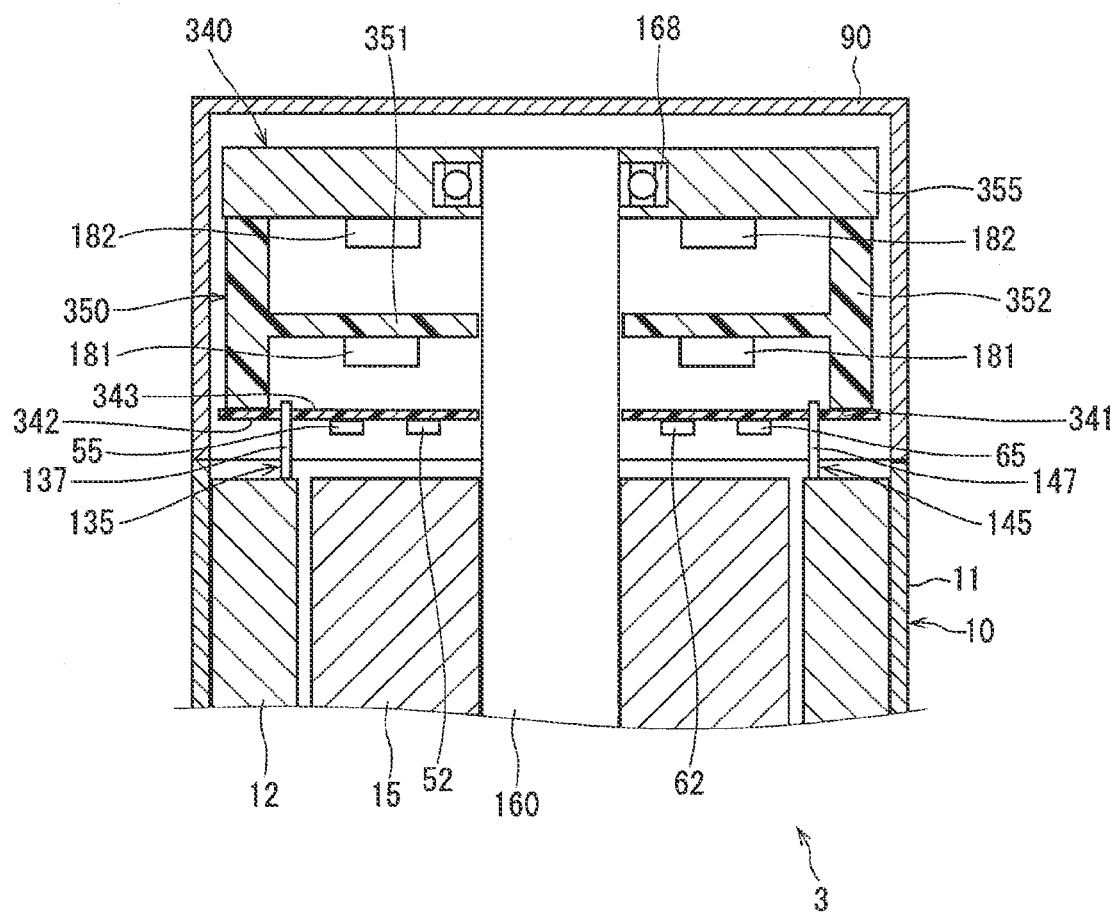
FIG. 18 is a sectional view of the drive device in a third embodiment of the present disclosure.
Figure 19:
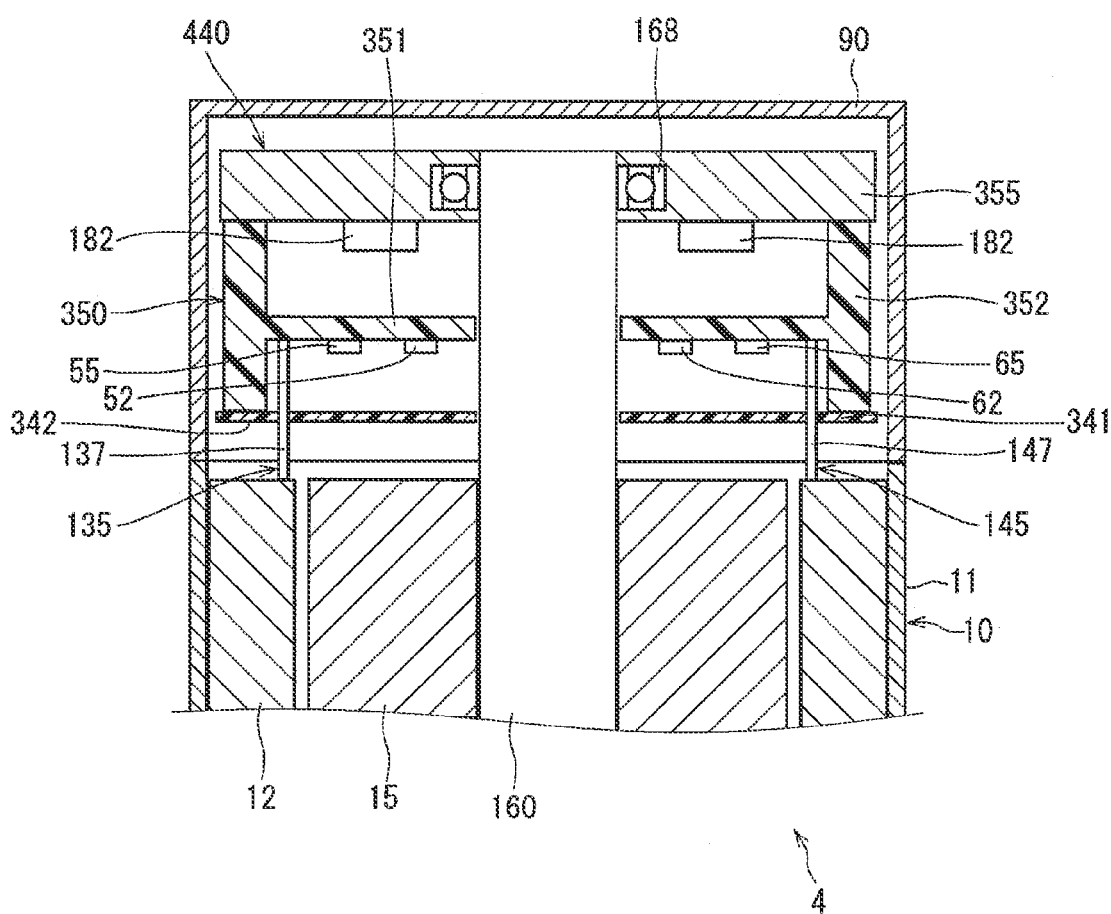
FIG. 19 is a sectional view of the drive device in a fourth embodiment of the present disclosure.
Figure 20:
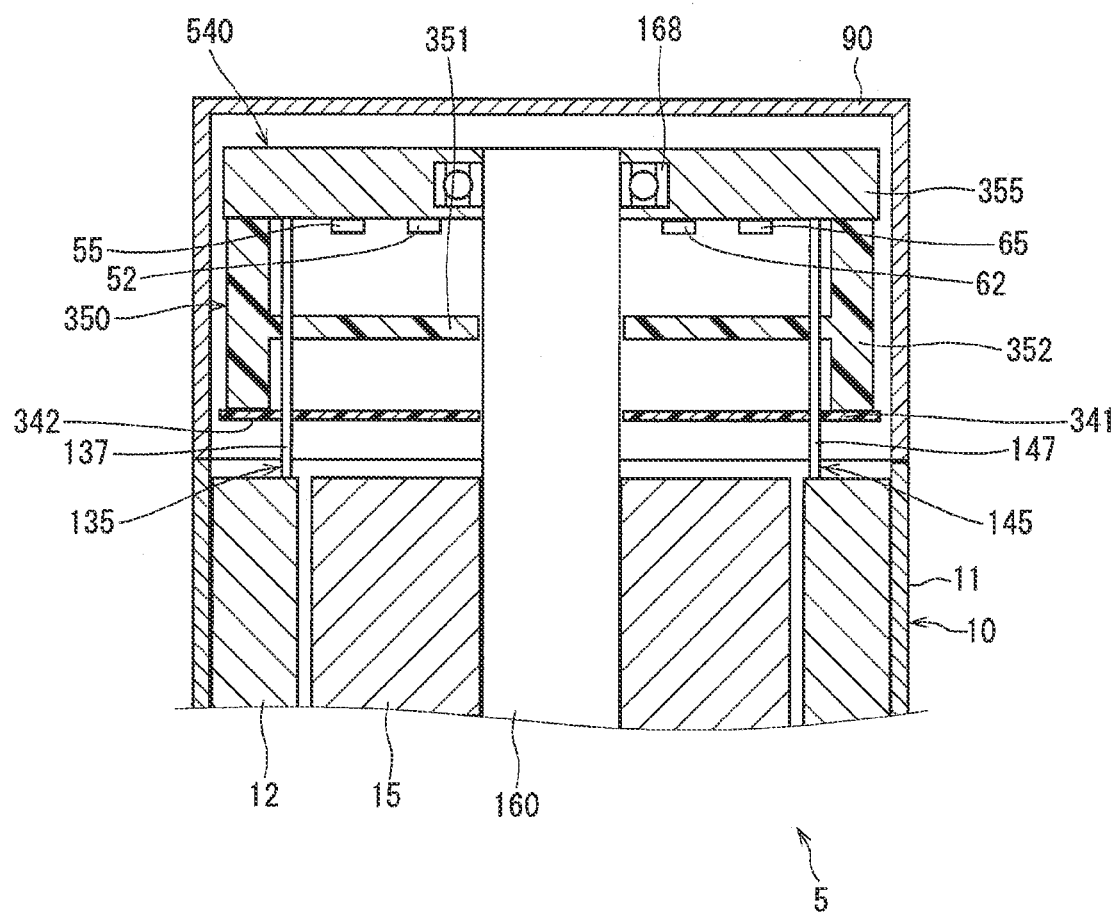
FIG. 20 is a sectional view of the drive device in a fifth embodiment of the present disclosure.

The third embodiment of the present disclosure is described with reference to FIG. 18. FIG. 18 is an illustrative cross section of a drive device 3, from which the connector and the like are omitted. Further, a hatching of the SW elements is also omitted. FIGS. 19 and 20 also have the same treatment.

An ECU 340 of the drive device 3 is different from the above embodiment. The ECU 340 has a substrate 341, a middle member 350 and a heat sink 355 arranged in this written order from a motor 10 side. A heat generation element mounting surface 342 of the substrate 341, which faces the motor 10, has the SW elements 51-56, 61-66 mounted thereon. The arrangement of the SW elements 51-56, 61-66 on the surface 342 is the same as FIG. 10. That is, just like the above-described embodiments, the arrangement of the first motor line 135 and the SW elements 51-56 and the arrangement of the second motor line 145 and the SW elements 61-66 are reversed to each other in terms of the phase arrangement from the electric power supply region Rin side. In the present embodiment, the heat generation element mounting surface 342 corresponds to a "one surface". Further, the reversed side of the substrate 341, i.e., a surface 343, may also be considered as a "one surface", and the SW elements 51-56, 61-66 may be mounted on the surface 343.

The middle member 350 includes a board shape part 351 and a periphery wall part 352. The board shape part 351 is formed substantially in a circular disk shape, and, on one surface of the middle member 350 facing the substrate 341, an electronic component 181 is mounted. The periphery wall part 352 stands on the board shape part 351 to extend toward the heat sink 355 and toward the substrate 341, at least a part of the periphery of the board shape part 351. The substrate 341 and the middle member 350 are electrically to connected by a wiring pattern or the like. A hole is bored substantially at the center of the substrate 341 and the middle member 350, for having a shaft 160 inserted thereinto.

A bearing 168 is disposed substantially at the center of the heat sink 355, for supporting the shaft 160 in a rotatable manner. An electronic component 182 is arranged on one surface of the heat sink 355 facing the motor 10. The electronic component 182 is connected with the middle member 350 by a terminal or the like, which is not illustrated. The electronic components 181, 182 are, for example, a relay, a capacitor, a coil, a microcomputer, an ASIC or the like. The electronic components 181, 182 may be mounted on the substrate 341, or on a surface of the board shape part 351 facing the heat sink 355. Even in such configuration, the same effects as the above-described embodiments are achieved.

Fourth and Fifth Embodiments

As shown in FIG. 19, the fourth embodiment of the present disclosure has a drive device 4, in which an ECU 440 is different from the third embodiment. In the fourth embodiment, the SW elements 51-56, 61-66 are arranged on a surface of the board shape part 351 facing the motor 10. In the present embodiment, the board shape part 351 is considered as a "substrate". The SW elements 51-56, 61-66 may also be arranged on the other surface of the board shape part 351 facing the heat sink 355.

As shown in FIG. 20, the fourth embodiment of the present disclosure has a drive device 5, in which an ECU 550 is different from the third embodiment. In the fifth embodiment, the SW elements 51-56, 61-66 are arranged on a surface of the heat sink 355 facing the motor 10. In the present embodiment, the heat sink 355 is considered as a "substrate".

The heat sink 355 is not electrically connected with the SW elements 51-56, 61-66 and with the motor lines 135, 145. The SW elements 51-56, 61-66 may be electrically connected with the middle member 350 or with the substrate 341 by a non-illustrated terminal or the like.

Further, even though the SW elements 51-56, 61-66 and the board shape part 351 are interposed with a gap in FIG. 20, the SW elements 51-56, 61-66 may be electrically connected with the other surface of the board shape part 351 facing away from the motor 10, and may be disposed to dissipate heat to the heat sink 355.

The phase order arrangement of the SW elements 51-56, 61-66 and the motor lines 135, 145 on the board shape part 351 or on the heat sink 355 is the same as the above-described embodiment. Further, when the electric power supply region Rin is disposed on the substrate 341, a projection area of the electric power supply region Rin projected along the shaft of the drive device 4 or 5 may be considered as the "reference position". The electric power supply region may also be disposed on the board shape part 351.

In FIGS. 19 and 20, the motor lines 135, 145 extend to reach the board shape part 351 or to reach the heat sink 355. However, (i) the substrate 341 and (ii) the board shape part 351 or the heat sink 355 may be considered as a "substrate", and the motor lines 135, 145 may be connected with the substrate 341. That is, the motor lines 135, 145 do not have to extend to reach the board shape part 351 or to reach the heat sink 355. Even in such configuration, the same effects as the above-described embodiment are achieved.

Further, the substrate 341 in FIGS. 19, 20 and the middle member 350 in FIG. 20 do not have the electronic component such as the capacitor, the coil, the microcomputer, the ASIC and the like may be mounted on the substrate 341 and the middle member 350.

Further, the electronic component arranged on the middle member 350 or on the heat sink 355 in FIGS. 18, 19 may be omitted.

OTHER EMBODIMENTS (a) Frame Member

According to the above-mentioned embodiments, the frame member is fixed onto the motor case by the frame lockscrew. According to other embodiments, the frame member may be fixed onto the motor case by using a component other than a screw. Further, the frame member may be fixed onto the motor case by press-fitting. In such manner, the number of components may be reduced. Further, the volume along the radius of the drive device may be reduced.

In the third to fifth embodiments, the frame member is not present. In other embodiments, the drive device having the middle member may have the frame member disposed therein, just like the third to fifth embodiments.

(b) ECU

According to the above-mentioned embodiments, the heat generation element may contact the frame member via the heat dissipation gel. According to other embodiment, the heat dissipation gel may be replaced with a heat dissipation sheet, or the heat generation element and the frame member may contact directly.

According to the above-mentioned embodiments, the SW elements have the heat dissipation slug exposed from the mold part. According to other embodiments, the heat dissipation slug may not be necessarily exposed from the SW element. The same applies to the power relay, the reverse connection protection relay, and the ASIC.

According to the above-mentioned embodiments, the drive element, the current detection element, the power relay, the reverse connection protection relay, and the ASIC respectively correspond to the heat generation element, and these heat generation elements are disposed to dissipate heat from their backs to the frame member.

According to other embodiments, the current detection element, the power relay, and the reverse connection protection relay may be mounted on a different surface from the one having the first/second drive elements, or may be omitted. Further, the first/second drive elements may be mounted on an opposite surface of the frame member relative to the rotating electric machine, i.e., on the electronic component mounting surface. In such case, the electronic component mounting surface corresponds to a "one surface".

Further, the current detection element may be implemented not as the shunt resistor, but as a hall IC etc., and the current detection element may only be provided for two phases or less. That is, the current detection element may be partially omitted. The power relay may be implemented as a mechanical relay.

Further, electronic components other than the above may also be mounted on the heat generation element mounting surface of the substrate as heat generation elements, to be enabled to dissipate heat from their backs toward the frame member.

Further, all or a part of the electronic components mounted on the heat generation element mounting surface may be configured not to dissipate heat toward the frame member.

According to the above-mentioned embodiments, among the electric components constituting the control unit, the ASIC is mounted on the heat generation element mounting surface, and the microcomputer is mounted on the electronic component mounting surface. According to the other embodiments, any electronic component constituting the control unit, i.e., the components other than the ASIC and the microcomputer may be arbitrarily combined to make a package.

Further, the ASIC may be mounted on the electronic component mounting surface, and the microcomputer may be mounted on the heat generation element mounting surface, for example. In other words, the electronic components regarding the control unit may be mounted on either one of the two surfaces, depending on the package configuration and/or the heat generation situation. Further, the microcomputer may be mounted in a non-overlapping region relative to the ASIC. The heat generation element mounting surface and the electronic component mounting surface simply indicate that the heat generation elements or the electronic components may be mountable on those surfaces, which does not necessarily mean that those surfaces should have the heat generation elements or the electronic components mounted thereon.

According to the above-mentioned embodiments, the SW element constituting the first inverter part and the SW element constituting the second inverter part are arranged axi-symmetric in the first embodiment, and the SW element constituting the first inverter part and the SW element constituting the second inverter part are arranged point-symmetric in the second embodiment.

According to other embodiments, the SW elements having the first embodiment configuration may have a point-symmetric arrangement, or the SW element having the second embodiment configuration may have an axi-symmetric arrangement.

Further, the SW element may also be arranged arbitrarily, i.e., not necessarily be in a symmetrical arrangement.

Further, the electronic components other than the SW element may also be arranged arbitrarily.

Further, according to the above-mentioned embodiments, the phase order in the first system is U, V, W from the near side of the electric power supply region, and the phase order in the second system is W, V, U from the near side of the electric power supply region. According to other embodiments, the phase order in the first system may be arbitrarily ordered, i.e., not necessarily be U, V, W order from the electric power supply region side. In other words, the first, second, and the third phases may respectively be any one of U, V, W phases. Further, the phase order in the second system may be in the reverse order of the first system. In such manner, the influence of the magnetic flux leakage on the rotational angle sensor may be reduced, just like the above-mentioned embodiments due to the cancellation of the leakage with each other. Further, the variation of the wiring impedance among the different phases may be reduced.

Further, the phase orders in the first extension line and the first drive element as well as the second extension line and the second drive element may be reversed with reference to other position other than the electric power supply region.

According to the above-mentioned embodiments, the first and second extension lines are arranged in a point-symmetric manner. According to other embodiments, the arrangement of the first and second extension lines may be other than point-symmetric. Further, at least one of the first and second extension lines may have no symmetric arrangement, i.e., may only have one side of a symmetric, both side arrangement. Furthermore, the first extension line may be disposed on the substrate at other position other than the radius outside position of the first region. Similarly, the second extension line may be disposed on the substrate at other position other than the radius outside position of the second region.

According to the above-mentioned embodiments, the elements are arranged, from the center axis side toward the radius outside, in an order of the high potential side elements, the low potential side elements, and the current detection elements. According to other embodiments, the element arrangement may be other orders other than the above, i.e., may be in a low potential side elements first order from the center axis side, or any other orders. Further, the current detection elements may be partially omitted, i.e., the current detection elements may be provided only for the two phases among the three.

According to the above-mentioned embodiments, the first distance from the center of the electric power supply region to the center of the first region and the second distance from the center of the electric power supply region to the center of the second region are substantially the same. According to other embodiments, the first distance and the second distance may be not necessarily the same. For example, the electric power supply region may be defined as an area close to a mounting position of the reverse connection protection relay 73 in FIG. 11. In such case, the "electric power supply region" may be defined flexibly as an inclusive area extending from an inverter side to an away-from-inverter side, including the power supply wiring pattern, and the phase order of the first system and the second system may be arranged with reference to the above-described electric power supply region, i.e., from the electric power supply region side to the away side in an order of the first, the second and the third phase in the first system and in an order of the third, the second, and the first phase in the second system. Even in such configuration, the variation of the impedances in different phases is reduced in comparison to the other phase order arrangement.

According to the first embodiment, the metal piece used for connection to the motor line is mounted on the substrate, and the substrate and the motor line are connected by press-fitting. Further, in the second embodiment, the substrate and the motor line are connected by soldering or the like.

According to other embodiments, the substrate and the motor line in the first embodiment configuration may be connected by solder, or the substrate and the motor line in the second embodiment configuration may be connected by the press-fitting of the metal piece that is disposed on the substrate, for example. Further, the connection between the substrate and the motor line may be established by any method other than soldering or press-fitting.

According to the above-mentioned embodiments, the substrate is fixed onto the substrate by using the substrate lockscrew. In other embodiments, the substrate may be fixed onto the substrate not only by using a screw thread but by any other method.

(c) Connector

According to the first embodiment, the connector comprises one power supply connector and two signal connectors. According to other embodiments, one or both of the power supply and signal connectors may be provided two sets or more. Those connectors may have separate bodies as in the first embodiment, or may have an integrated body as in the second embodiment.

Further, when no motor case is provided as shown in the second embodiment, the stator may serve as the "rotating electric machine" and the connector may be positioned within the projection area of the stator along the axial direction. Further, based on an assumption that the connector and the cover member are provided as separate bodies, the connector may be fixed onto the large-size component mounting surface of the substrate (i.e., on an opposite side relative to the motor).

Further, the number of connectors, the orientation of the opening of the connector, and the cover member arrangement as to having one body with the connector or not, may all be arbitrarily combined in configuration.

(d) Cover Member

According to the first embodiment, the cover member is fixed onto the frame member with adhesives. According to the second embodiment, the cover member is caulked to the frame member. The cover member may be fixed onto the frame member by any other method such as fixing by using a screw or the like.

(e) Drive Unit

According to the above-mentioned embodiments, the rotating electric machine is a three-phase brushless motor. According to other embodiments, the motor may be any kind, i.e., not necessarily the three-phase brushless motor but any kind of motor having three or more phases.

Further, the rotating electric machine may be not only a motor (i.e., an electric motor) but a generator, and may also be a motor-generator having a motor function and a generator function.

According to the above-mentioned embodiments, the output end connected to the gear is disposed on an opposite side of the ECU relative to the motor. In other words, the drive device in the above-mentioned embodiments, the output end, the motor, and the ECU are arranged in this written order.

According to other embodiments, the output end may be arranged on the same side relative to the motor. In other words, the output end, the ECU and the motor may be arranged in this written order in other embodiments.

According to the above-mentioned embodiments, the drive device is applied to an electric power steering device.

According to other embodiments, the drive device may be applied to a device other than the electric power steering device.

Such changes, modifications, and summarized schemes are to be understood as being within the scope of the present disclosure as defined by appended claims.

What is claimed is:

1. A drive device comprising:
   a rotating electric machine including a stator with a first winding group and a second winding group wound on the stator in at least three phases, a rotor rotatably disposed relative to the stator, and a shaft rotating with the rotor;
   a substrate disposed on one axial end of the rotating electric machine;
   a first drive element (i) arranged on one surface of the substrate in a first region and (ii) constituting a first inverter that switches a power supply to the first winding group;
   a second drive element (i) arranged on a same surface of the substrate as the first drive element in a second region and (ii) constituting a second inverter that switches a power supply to the second winding group, the second region being symmetric to the first region relative to a shaft of the rotating electric machine;
   a first extension line extending from each of the at least three phases of the first winding group to be connected to the substrate; and
   a second extension line extending from each of the at least three phases of the second winding group to be connected to the substrate,
   wherein the first extension line and the first drive element, as well as the second extension line and the second drive element have respectively reversed phase orders in an arrangement of the phase orders from an end close to a reference position toward an other end of the arrangement.

2. The drive device of claim 1, wherein
   the reference position comprises an electric power supply region that is (i) a region outside of the first region, the second region and a drive element region that includes a center axis of the rotating electric machine, and (ii) a region including a circuit pattern that supplies an electric power from a battery to the first inverter and to the second inverter.

3. The drive device of claim 2 further comprising:
   a relay switchable to conduct and intercept an electric current from the power supply to the first inverter or second inverter, the relay disposed in the electric power supply region on a same surface of the substrate as the first drive element and the second drive element.

4. The drive device of claim 1 further comprising:
   a frame member disposed at a position between the rotating electric machine and the substrate, wherein
   the first drive element and the second drive element are arranged on a frame member facing surface of the substrate in a heat dissipatable manner toward the frame member.

5. The drive device of claim 1, wherein
   the first extension line is connected with the substrate at a radius outside position of the first region, and
   the second extension line is connected with the substrate at a radius outside position of the second region.

6. The drive device of claim 5 further comprising:
   an electric current detection element detecting an electric current supplied to each of the at least three phases of the first winding group and the second winding group, the electric current detection element (i) arranged on the same surface of the substrate as the first drive element and the second drive element and (ii) disposed at a position either between the first drive element and the first extension line or between the second drive element and the second extension line.

7. The drive device of claim 1, wherein
   the first drive element and the second drive element are arranged around the shaft of the rotating electric machine, the first drive element and the second drive element each including (i) high potential elements located close to the shaft and (ii) low potential elements located outside of the high potential elements, relative to the shaft of the rotating machine.

8. The drive device of claim 1, wherein
   the first extension line and the second extension line are point-symmetrically arranged relative to the shaft of the rotating electric machine.

9. The drive device of claim 1, wherein
   the first extension line and the second extension line respectively have a symmetric arrangement of phases, in which a center phase has other phases arranged on both sides of the center phase.

10. The drive device of claim 1, wherein
    the first extension line and the second extension line are disposed along a circular region on the substrate.

11. The drive device of claim 1, wherein
    the first extension line is linearly arranged through the substrate, and
    the second extension line is linearly arranged through the substrate.

12. An electric power steering device comprising:
    a drive device comprising:
      a rotating electric machine including a stator with a first winding group and a second winding group wound on the stator in at least three phases, a rotor rotatably disposed relative to the stator, and a shaft rotating with the rotor;
      a substrate disposed on one axial end of the rotating electric machine;
      a first drive element (i) arranged on one surface of the substrate in a first region and (ii) constituting a first inverter that switches a power supply to the first winding group;
      a second drive element (i) arranged on a same surface of the substrate as the first drive element in a second region and (ii) constituting a second inverter that switches a power supply to the second winding group, the second region being symmetric to the first region relative to a shaft of the rotating electric machine;
      a first extension line extending from each of the at least three phases of the first winding group to be connected to the substrate; and
      a second extension line extending from each of the at least three phases of the second winding group to be connected to the substrate,
      wherein the first extension line and the first drive element as well as the second extension line and the second drive element have respectively reversed phase orders in an arrangement of the phase orders from an end close to a reference position toward an other end of the arrangement; and
    a power transmission part transmitting a torque that is output from the rotating electric machine to a drive object, wherein a steering operation of a steering wheel by a driver is assisted by the torque from the rotating electric machine, the torque being used for driving the drive object.

* * * * *